(12) United States Patent
Kundu

(10) Patent No.: US 10,465,854 B2
(45) Date of Patent: *Nov. 5, 2019

(54) TEMPERATURE-STABLE PARAFFIN INHIBITOR COMPOSITIONS

(71) Applicant: Ecolab USA Inc., St. Paul, MN (US)

(72) Inventor: Kousik Kundu, Houston, TX (US)

(73) Assignee: Ecolab USA Inc., St. Paul, MN (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/480,959

(22) Filed: Apr. 6, 2017

(65) Prior Publication Data

US 2017/0292657 A1  Oct. 12, 2017

Related U.S. Application Data

(60) Provisional application No. 62/319,545, filed on Apr. 7, 2016.

(51) Int. Cl.
*F17D 3/12* (2006.01)
*C09K 8/524* (2006.01)
*C09K 8/506* (2006.01)

(52) U.S. Cl.
CPC .............. *F17D 3/12* (2013.01); *C09K 8/506* (2013.01); *C09K 8/524* (2013.01)

(58) Field of Classification Search
CPC ............ C09K 8/524; C09K 8/506; F17D 3/12
See application file for complete search history.

(56) References Cited

U.S. PATENT DOCUMENTS

| | | |
|---|---|---|
| 2,981,684 A | 4/1961 | Barnes et al. |
| 3,419,368 A | 12/1968 | Leas |
| 4,110,283 A | 8/1978 | Capelle |
| 4,670,516 A | 6/1987 | Sackmann et al. |
| 4,906,682 A | 3/1990 | Mueller et al. |
| 5,336,441 A | 8/1994 | Shah et al. |
| 5,756,004 A | 5/1998 | Brezinski |
| 5,851,429 A | 12/1998 | Magyar |
| 6,260,620 B1 | 7/2001 | Furman et al. |
| 6,309,431 B1* | 10/2001 | Becker ............... C10L 1/143 44/393 |
| 6,488,868 B1 | 12/2002 | Meyer |
| 6,783,582 B2 | 8/2004 | Goldman |
| 7,057,050 B2 | 6/2006 | Meyer |
| 7,338,541 B2 | 3/2008 | Connor et al. |
| 7,449,429 B2 | 11/2008 | Goldman |
| 9,080,120 B2 | 7/2015 | Adams et al. |
| 9,090,849 B2 | 7/2015 | Adamczewska et al. |
| 9,120,885 B2 | 9/2015 | Castro Sotelo et al. |
| 2002/0166995 A1 | 11/2002 | Robinson et al. |
| 2002/0193644 A1* | 12/2002 | Feustel ............... C10G 21/00 585/1 |
| 2004/0110877 A1* | 6/2004 | Becker ............... B01F 17/0085 524/114 |
| 2007/0213231 A1 | 9/2007 | Jennings |
| 2007/0221539 A1* | 9/2007 | Cohrs ............... B01D 17/047 208/18 |
| 2008/0078549 A1 | 4/2008 | Moorehead et al. |
| 2014/0165457 A1 | 6/2014 | Castro et al. |
| 2014/0273150 A1 | 9/2014 | Angel |
| 2015/0038470 A1* | 2/2015 | Keasler ............... A01N 57/34 514/129 |
| 2017/0152201 A1* | 6/2017 | Becker ............... B01D 3/143 |

FOREIGN PATENT DOCUMENTS

| | | |
|---|---|---|
| CN | 103614128 A | 3/2014 |
| WO | 0104238 A1 | 1/2001 |
| WO | 03/042428 A1 | 5/2003 |
| WO | 2005098200 A2 | 10/2005 |

OTHER PUBLICATIONS

International Search Report for International Application No. PCT/US2017/026367, dated Jun. 19, 2017, 6 pages.
Written Opinion for International Application No. PCT/US2017/026367, dated Jun. 19, 2017, 13 pages.
Lashkarbolooki et al, "Mitigation of Wax Deposition by Wax-Crystal Modifier for Kermanshash Crude Oil", Journal of Dispersion Science and Technology, vol. 32, No. 7, Jul. 2011, pp. 975-985.
DOW P-Series Glycol Ethers, Product Information, (1992), 3 pages.
Vertellus Specialties Inc., Citroflex Product Brochure, 16 pages, (2013).
Hallstar Technical Publication, "The Function and Selection of Ester Plasticizers," 26 pages.
Eastman Chemical Company, "Plasticizer formulation selector guide", Technical Tip, 4 pages, (2014).
Hallstar, Ester Plasticizers for Elastomers, Hallstar Elastomer Brochure, 26 pages (2013).
Hallstar, "Plasticizer/Polymer Polarity Chart," 4 pages.
George Wypych, "Plasticizers Use and Selection for Specific Polymers," Chapter 11, 107 pages, 2012.
Stephen O'Rourke, Hallstar Technical Publication, "High Performance Ester Plasticizers," (2001) 17 pages.
Wesley H. Whittington, Hallstar Technical Publication, "Ester Plassticizers for Polar Elastomers with Emphasis on Low-Temperature," 12 pages, (1983).

(Continued)

*Primary Examiner* — James C Goloboy

(74) *Attorney, Agent, or Firm* — Kagan Binder, PLLC

(57) ABSTRACT

Disclosed are compositions including up to 20 wt % of a paraffin inhibiting polymer, a refined petroleum distillate and one or more low Log P molecules, wherein the compositions are stable and flow at a temperature between about 0° C. and −40° C., in many cases between about −20° C. and −40° C. The low Log P molecules are non-polymeric, have a Log P of less than 1, are liquids at 20° C. (1 atm), and have boiling points over 60° C., in many cases over 100° C. The compositions are useful paraffin inhibitor concentrates for use in the petroleum industry wherein the concentrates are stable, pumpable, and pourable at temperatures as low as −40° C. and as high as 60° C.

18 Claims, No Drawings

(56) References Cited

OTHER PUBLICATIONS

European Search Report for EP Application No. 17736294.4, dated May 28, 2019, 7 pages.
European Search Report for EP Application No. 17736295.1, dated May 28, 2019, 7 pages.

* cited by examiner

TEMPERATURE-STABLE PARAFFIN INHIBITOR COMPOSITIONS

FIELD OF THE INVENTION

The present invention generally relates to temperature stable paraffin inhibitor compositions.

BACKGROUND

Crude oil products are globally obtained from subterranean reservoirs using techniques such as drilling and hydraulic fracturing. Transportation of crude oil products from the subterranean reservoir, required to process, i.e. refine, the crude oil, is accomplished by moving the crude oil through pipes and into storage/transportation means such as rail cars, tanks, and the like. During the moving, production, and/or storage, the crude is often subjected to ambient temperatures between −40° C. and 60° C.

Crude oil products include linear and branched alkanes having the general formula $C_nH_{2n+2}$ wherein n is typically about 1-50, although minor amounts of longer hydrocarbon chains do occur. The higher molecular weight alkanes can be problematic in that their melting points tend to be greater than ambient temperatures in some cases. For example, nonadecane has a melting point of 33° C.; higher alkanes can have melting points in excess of 60° C. for example.

The high melting alkane fractions lead to formation of paraffinic residue that solidifies and deposits on the sides and bottoms of pipes, storage vessels, and transportation vessels (rail cars, ocean tankers, etc.). The solidified paraffinic residue, also known as "paraffin wax", not only reduces the effective volume of the structure it is contained within but also represents a loss of a valuable component from the body of the crude oil. Paraffin wax build up, especially excessive paraffin wax buildup reduces the efficiency of transporting crude oil and leads to increased costs related to added downtime for cleaning of the pipes and/or vessels as well as disposal of residues removed from the vessel which increase environmental burden. While the pipelines and vessels can be cleaned to remove the paraffinic residue, the process generates hazardous waste, takes the vessel out of service during the cleaning period, and is expensive.

The formation of paraffin wax can be reduced by "paraffin inhibitors" (PI) which interfere with the crystallization process of wax and/or suspend wax crystals in the oil. The addition of PI to the crude oil is effective in dispersing the paraffinic residue, thereby reducing the formation of residues in the pipelines and vessels to the benefit of the oil and gas industry. The PI effectively reduce the formation of paraffinic residues during storage and transportation of the crude oil products, mitigating economic loss and decreasing environmental impact.

Typical paraffin inhibitor polymers include, e.g. ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers and polyethyleneimines.

Nonaqueous formulations including such paraffin inhibitors as concentrate ("PIC") must also be transported to, and stored at the field locations where crude oil is recovered so that it can be applied as needed to the contents of the pipes, vessels, and the like. Providing PIC in a fluid format—i.e. in solution or dispersion—is highly advantageous for applying PI in the field because pumping equipment suitable to meter the desired amount of PI into a pipe or vessel is readily available. However, severe dispensing and usage problems are associated with the use of nonaqueous paraffin inhibitor concentrates (PIC) in areas where the winter temperature goes well below 0° C. In some field locations, for example, a winter temperature of −10° C. or less, −20° C. or less, −30° C. or less, or even −40° C. or less is not unusual. In such temperatures, PICs tend to form a gel or a solid (with the PI polymer solidifying or precipitating from the PIC liquid) with decreasing temperature, leading to the aforementioned severe dispensing and usage problems.

Previous solutions to the problem of PIC solidification include the addition of relatively large amounts (e.g., more than about 20 wt % or vol %) of low-boiling point solvents, such as methanol, to the PIC compositions. However, use of such large amounts of solvents can pose many different problems. The previous solutions formed dispersions of PI polymers in solvents. Often times the dispersed formulations were milky. The dispersions included larger particles sizes which limited the applicability in situations such as capstringing. Over time, the PI polymers tend to settle out of the dispersions. Even at higher concentrations (e.g., more than 20 wt % or vol %) of low-boiling point solvents, the paraffin inhibiting compositions still tend to freeze solid within days. At higher temperatures, systems containing large amounts of low-boiling point solvents can have a substantial vapor pressure, even dangerous overpressures which can lead to rupture of storage tanks. While cold temperatures are of concern to crude oil field operations, temperatures of up to about 60° C. are also encountered—often at the same field locations, depending on the seasonal weather patterns. It would be advantageous to provide additives for PICs that reduce the formation of solids therein from −40° C. to 60° C., thereby allowing the pumping of the PIC in the field within this temperature range and without buildup of high vapor pressure at the upper end of the range.

SUMMARY OF THE INVENTION

A paraffin inhibitor concentrate (PIC) composition that is a flowable and stable liquid at low temperatures is provided for reducing paraffin or wax deposition in a crude oil storage or transportation vessel upon dilution. The PIC composition comprises, consists essentially of, or consists at least of one paraffin inhibitor (PI), a refined petroleum solvent, and at least one low Log P molecule or compound. A general structure for the low Log P molecules may be any polar molecule having 8 or less carbons and a Log P similar to that of methanol (e.g., below about 1).

In some embodiments, the PIC compositions herein comprise, consist essentially of, or consist of a PI; one or more low Log P molecules; a low polarity refined petroleum solvent (e.g., toluene, HAN, etc.); a weak base having one or more amine moieties or a reaction product thereof, where the PIC remains a stable composition at −40° C. (e.g., the PI polymer remains in solution or is soluble enough in solution to remain therein upon filtering through a filter having a 10 m or 100 m average pore size).

The low Log P molecule is a solvent to the PI polymers herein, is non-polymeric with a molecular weight of 200 g/mol or less, and each molecule of the low Log P molecule has 8 or fewer carbon atoms therein. In embodiments, the PIC compositions are nonaqueous compositions. In embodiments, each of the components of the compositions are in stable solution and flow at a temperature between about 0° C. and −40° C., or lower.

In some embodiments, the low Log P molecule is a liquid at 20° C. at atmospheric pressure and has a boiling point greater than 60° C., or greater than 100° C., or greater than 150° C., or greater than 200° C. at atmospheric pressure.

In an embodiment, the PIC composition comprises about 1 wt % to 20 wt % of the one or more PI polymers or mixtures thereof. The composition comprises about 1 wt % to 20 wt % of one or more low Log P molecules or mixture thereof. The composition further comprises about 50 wt % to about 80 wt % of a refined petroleum solvent. In some embodiments, the composition further comprises one or more surfactants. In some embodiments, the composition comprises about 10 wt % to 20 wt % of the one or more surfactants, stabilizers, biocides, preservatives, or a combination thereof.

In some embodiments, the PIC comprises about 1 wt % to 20 wt % of a PI polymer or mixtures of one or more PI polymers. In some embodiments, the PI polymer comprises an alkylphenol-formaldehyde copolymer having the formula (I):

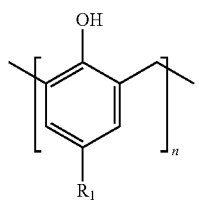

wherein $R_1$ includes $C_9$-$C_{50}$ alkyl and n=2-200 linear and n=2-6 for cyclic.

In some embodiments, the PI polymer comprises a copolymer comprising the residues of one or more alpha olefin monomers and a maleic anhydride monomer, the one or more alpha olefin monomers having the formula (II):

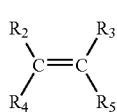

wherein $R_2$, $R_2$, $R_3$, and $R_5$ are independently selected from hydrogen and $C_5$-$C_{60}$ alkyl, with the proviso that at least two thereof are hydrogen; the alkyl maleic anhydride monomer having the formula (III):

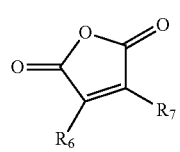

wherein $R_6$ and $R_7$ are independently selected from hydrogen or $C_1$-$C_{30}$ alkyl. In some embodiments, the maleic anhydride residue is further reacted with about 0.01 to 2.0 equivalents of a $C_{12}$-$C_{60}$ alkanol or amine per equivalent of anhydride. In some embodiments, the paraffin inhibiting polymer comprises an ethylene-vinyl acetate copolymer.

In some embodiments, the PI polymer comprises an acrylate polymer, such as an acrylate polymer comprising the residues of two or more acrylates (e.g., methacrylate, behenyl PI paraffin inhibiting polymer, having one or more acrylates may have the formula (IV):

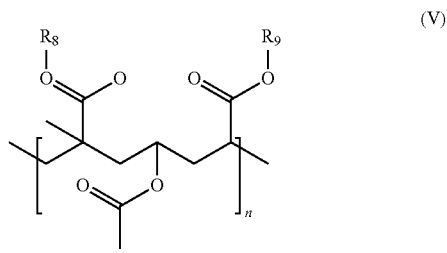

wherein $R_8$=$C_1$-$C_{25}$ alkyl, $R_9$=$C_{10}$-$C_{15}$ alkyl, and n=1-100.

In some embodiments, a PIC comprises more than one of the PI polymers. For example, a PIC may include a copolymer including the residues of one or more alpha olefin monomers and a maleic anhydride monomer, and an alkylphenol-formaldehyde copolymer.

A composition is provided comprising, consisting essentially of, or consisting of a crude oil source and a nonaqueous liquid PIC composition comprising a solubilized PI polymer, a refined petroleum solvent, and a low Log P molecule, wherein the nonaqueous liquid PIC composition is a stable mixture that flows at a temperature between about 0° C. and −40° C., and wherein the PI polymer is present in the crude oil source at about 5 ppm to 10,000 ppm (parts by weight).

A composition is provided in a kit, the kit comprising, consisting essentially of, or consisting of a nonaqueous liquid PIC composition including a solubilized PI polymer and a low Log P molecule, wherein the nonaqueous liquid PIC composition is a stable mixture that flows at a temperature between about 0° C. and −40° C.; a container to hold said nonaqueous liquid PIC composition at temperatures between about 60° C. and −40° C.; and instructions for use of the nonaqueous liquid composition.

A method is provided comprising, consisting essentially of, or consisting of forming a nonaqueous liquid PIC composition comprising a solubilized PI polymer and a low Log P molecule and the composition is a stable mixture that flows at a temperature between about 0° C. and −40° C.; storing the composition in an enclosed container at a first temperature between about −40° C. and 60° C.; removing the composition from the container at a second temperature between about −40° C. and 60° C.; and applying the composition to a crude oil source, wherein the removing and the applying are accomplished using a mechanical pump. In some such embodiments, the first temperature, the second temperature, or both, are between about −40° C. and −20° C.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, the term "low Log P molecule" means a non-polymeric compound, component, or chemical species having 1 to 8 carbons, a Log P lower than about 1 (or a specific range therebelow), and a molecular weight of about 20 g/mol to about 200 g/mol. Log P, also known as "partition coefficient" is the logarithm of the ratio of concentrations of a molecule in a mixture of two immiscible phases—water and octanol—at equilibrium. Thus Log P=log([un-ionized solute in octanol]/[un-ionized solute in water]). While the singular "molecule" is used, it should be noted that "low Log P molecule" refers not just to a single molecule but a plurality thereof forming a specific weight or volume of the compound, component, or chemical species as determined by context.

As used herein, the term "non-polymeric" refers to a compound characterized as having three or less covalently bonded repeating units and a molecular weight of less than 600 g/mol.

As used herein, the term "PIC" or "PIC composition" means a mixture or composition of at least one PI polymer; at least one refined petroleum solvent such as HAN, xylene, or toluene; and at least one low Log P molecule. Optionally, a PIC may include one or more surfactant(s), quenching or stabilizing agent(s) or reaction products thereof (e.g., diethylenetriamine ("DETA") or p-toluene sulfonic acid ("PTSA"), biocide(s), preservative(s), as disclosed herein below.

As used herein, the term "additive composition" means a composition which includes at least one low Log P molecule and another component. An additive composition may include at least one surfactant, biocide, preservative, or stabilizer, as disclosed herein below. While an "additive composition" may include more than one component, the term "additive" can be used to refer to single components of a multi-component additive composition as determined by context.

As used herein, the term "nonaqueous" means substantially excluding water.

As used herein, the term "liquid", "flows", or "flow" referring to a composition of the invention means that 10 mL of the composition vertically at rest on a substantially horizontal surface in a cylindrical container having dimensions of radius 1 inch and height 2 inches flows observably within about 10 seconds when tipped to a substantially horizontal position. In some embodiments, "liquid", "flows", or "flow" referring to a composition of the invention means a composition that has a Brookfield viscosity at $10\ s^{-1}$ of about 5 cP to 1000 cP.

As used herein, the term "crude oil" or "crude oil source" or "crude oil product" means the hydrocarbon product of a subterranean reservoir, wherein the product is a liquid or a solid at 20° C. under a pressure of 1 atm, the product including at least linear and branched alkanes having the general formula $C_nH_{2n+2}$ wherein n is typically about 1-50, and can be greater than 50.

As used herein, the term "solidification point" means the temperature at which a composition no longer pours or flows. Likewise, "solidified" refers to a composition that does not pour or flow, and "solidification" refers to the process or state of being solidified.

As used herein, the term "stable" as used in conjunction with the terms "composition," "mixture," "liquid," "solution," and "concentrate" means a liquid composition comprising a paraffin inhibiting polymer, one or more low Log P molecules, and one or more refined petroleum solvents, wherein when the liquid composition is filtered through a filter having a 10 μm, 100 μm, or 1000 μm average pore size at least 50 (wt. or vol.)% of the paraffin inhibiting polymer passes through the filter.

As used herein, the terms "comprise(s)," "include(s)," "having," "has," "can," "contain(s)," and variants thereof, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of," and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Paraffin Inhibitor Concentrates (PIC)

It has been discovered that specific amounts and species of low Log P molecules (e.g., specific polar molecules having about 8 or less total carbon atoms) are useful as additives in nonaqueous PICs to increase stability and reduce or eliminate solidification (e.g., decrease pour point) of specific PIs (paraffin inhibitors) and PICs comprising the same at low temperatures (e.g., about 0° C. to about −40° C. or below about −40° C.).

Thus, disclosed herein are temperature stable paraffin inhibitor concentrate (PIC) compositions and methods for inhibiting solidification in paraffin inhibitor concentrates (and the PI polymers therein) at temperatures encountered during storage and/or transportation thereof, e.g. about −40° C. to 60° C. The temperature stable PICs are stable mixtures that flow, and thus are pourable or pumpable, at temperatures of −40° C. or below, or about 0° C. to −40° C., or about −5° C. to −40° C., or about −10° C. to −40° C., or about 0° C. to about −20° C., or about −10° C. to −30° C., or about −15° C. to −40° C., or about −20° C. to −40° C., or about −25° C. to −40° C., or about −30° C. to −40° C. and do not undergo observable phase separation at such temperatures. In some embodiments, the compositions further do not phase separate or solidify upon subsequent warming to 20° C., or as high as 60° C. In some embodiments, the warmed compositions remain stable mixtures, in a single phase. In some embodiments, the compositions have a homogeneously dispersed or emulsified phase substantially over the temperature range of −40° C. to 60° C. even over long storage such as weeks or months.

The PICs disclosed herein include one or more PI polymers, one or more low polarity refined petroleum solvents (e.g., HAN), and one or more low Log P molecules. The PICs disclosed herein may also include one or more surfactants, one or more preservatives, one or more stabilizers (e.g., quenchers), one or more biocides, or combinations of any of the foregoing.

The PICs disclosed herein include a surprisingly small amount of low Log P molecules in a solution comprising one or more PI. The relatively small amounts of low Log P molecules in the PICs herein tend to act as an enhancing agent rather than a solvent. That is, rather than providing a solvent to disperse the PI polymer into, the low Log P molecules herein enable the PI polymers to remain in stable solution even at very low temperatures. This is a surprising result based on conventional knowledge which requires relatively large amounts of methanol solvents (e.g., greater than about 20 wt %) to lower the pour point.

In some embodiments, the PIC compositions of the invention are nonaqueous. In other embodiments, the PIC compositions include up to about 10 wt % water, or up to about 9% water, or up to about 8% water, or up to about 7% water, or up to about 6% water, or up to about 5% water, or up to about 4% water, or up to about 3% water. In embodiments, the PIC compositions are characterized as having a substantially transparent, homogeneous appearance at least at one selected temperature between about 0° C. and 20° C., for example at 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., or 20° C.

Conventional PICs comprise, consist essentially of, or consist of a paraffin inhibitor (PI) and one or more petroleum-based solvents, optionally including a low-boiling cosolvent such as methanol (in a relatively high amount, more than 20 wt %), or one or more surfactants, or both. However, such low-boiling point cosolvents can be volatile and typically do not store well at relatively higher temperatures (e.g., above 40° C.). Typically, the PI is a polymer such as a branched or comb-like polymer. Suitable PI include ethylene polymers and copolymers thereof with vinyl acetate, acrylonitrile, or α-olefins such as octene, butene, propylene, and the like; comb polymers with alkyl side chains such as methacrylate ester copolymers, maleic-olefinic ester copolymers, and maleic-olefinic amide copolymers; and branched copolymers having alkyl side chains such as alkylphenol-formaldehyde copolymers (e.g., a formaldehyde-phenolic resin) and polyethyleneimines.

A suitable alkylphenol-formaldehyde copolymer may have the formula (I):

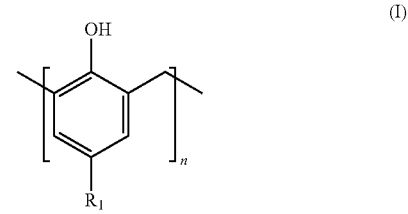

wherein $R_1=C_9-C_{50}$ alkyl and n=2-200 in case of linear polymers and n=2-6 for cyclic (e.g., calixarene type) polymers. In some embodiments, n=2-100, 2-50, 2-20. In some embodiments, the alkyl substituent $R_1$ may include $C_9-C_{40}$ alkyl substituents, or $C_{10}-C_{20}$, or $C_{12}-C_{16}$, or $C_{20}-C_{30}$, or $C_{25}-C_{50}$ alkyl substituents.

In some embodiments, the PI comprises a copolymer comprising the residues of (i) an alpha olefin monomer and a maleic anhydride monomer (alpha olefin/maleic anhydride copolymer ("OMAC")) or (ii) a maleic anhydride monomer and styrene. The alpha olefin monomer has the formula (II):

wherein $R_2$, $R_3$, $R_4$, and $R_5$ are independently selected from hydrogen and $C_5-C_{60}$ alkyl, with the proviso that at least two thereof are hydrogen; a blend of two or more such alpha olefin monomers having formula (II) are suitably included in the copolymer. In some embodiments $R_2$, $R_3$, $R_4$, and $R_5$ are independently hydrogen or $C_{12}-C_{60}$. The maleic anhydride monomer has the formula (III):

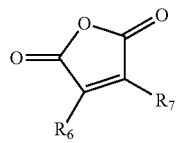

(III)

wherein $R_6$ and $R_7$ are independently hydrogen or $C_1$-$C_{60}$ alkyl. In some embodiments $R_6$ and $R_7$ are independently hydrogen or $C_{12}$-$C_{30}$.

In some embodiments, the copolymer of (II) and (III) is further reacted via the maleic anhydride residue with one or more alkanol or amine compounds to form the corresponding carboxylate or amide functionalities. In some such embodiments, the maleic anhydride residue is reacted with about 0.5 to 2.0 equivalents of the alkanol or amine per equivalent of anhydride. The alkanol or amine compounds are linear, branched, aromatic, or alkaromatic compounds having about 12 to 60 carbons.

In some embodiments, the paraffin inhibiting polymer comprises an imide, such as an alkyl maleimide copolymer (or a derivative thereof) comprising the residues of a succinic anhydride and an amine, or residues of an amine and a substituted succinic acid. The alkyl maleimide copolymer (or derivative thereof) may have the general formula (IV):

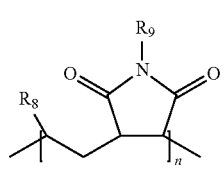

(IV)

wherein $R_8$=$C_1$-$C_{50}$ alkyl, $R_9$=$C_1$-$C_{50}$ alkyl, and n=1-500. In some embodiments, n=1-200, 1-100, 1-50, or 1-20.

In some embodiments, the paraffin inhibiting polymer comprises an acrylate polymer, such as an acrylate polymer comprising the residues of two or more acrylates (e.g., methacrylate, behenyl methacrylate, vinyl acetate, lauryl acrylate, etc.). In some embodiments, the paraffin inhibiting polymer, having one or more acrylates may have the formula (IV):

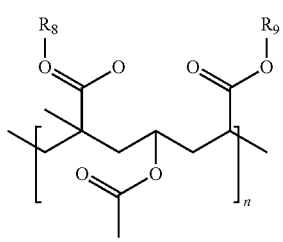

(V)

wherein $R_{10}$=$C_{15}$-$C_{25}$ alkyl, $R_{11}$=$C_{10}$-$C_{15}$ alkyl, and n=1-500. In some embodiments, n=1-200, 1-100, 1-50, or 1-20.

In some embodiments, polymers that are paraffin inhibitors for crude oil also have additional utility as asphaltene dispersants, pour point depressants, flow improvers, and may provide other crude oil benefits known to one skilled in the art. Therefore, in some embodiments the PIC provides a benefit to crude oil as not only paraffin inhibitor but also as an asphaltene dispersant, pour point depressant, and flow improver and may also provide other crude oil benefits known to one skilled in the art.

The PI polymer is present in the PIC typically at about 1 wt % to 30 wt %, for example about 2 wt % to 20 wt %, about 1 wt % to 15 wt %, greater than about 0 wt % to about 5 wt %, or about 1 wt % to about 4 wt %, and is diluted in the field to about 50 ppm to 10,000 ppm PI (or with the PICs disclosed herein even as little as 5 ppm to 10,000 ppm) by adding the PIC into a crude oil source, often along with one or more additives to accomplish e.g. biocidal activity, corrosion resistance, and the like.

Petroleum-based solvents that provide the balance of PIC compositions comprise, consist essentially of, or consist of a refined petroleum distillates or solvents. Refined petroleum distillates or solvents comprise, consist essentially of, or consist of aromatic compounds such as benzene, toluene, xylene, light aromatic naphtha, heavy aromatic naphtha (HAN), or kerosene; and/or aliphatic compounds such as pentane, hexane, heptane, octane, nonane, decane, undecane, dodecane, tridecane, tetradecane, pentadecane, hexadecane, or any of their cyclic or branched isomers or a mixture thereof. Naphtha is a petrochemical industry term describing boiling point fractions of petroleum distillate collected at different points on a distillation column. Naphtha fractions may include linear or branched or cyclic alkanes or alkenes, aromatic hydrocarbons, or fused ring aromatic compounds or mixtures of these materials. Light naphtha is lower boiling material collected near the top portion of the distillation column; medium naphtha higher boiling material from near the middle. Heavy naphtha is an even higher boiling material from near the bottom portion of the column. PI polymer solubility, particularly at temperatures below 20° C., limits the amount of polymer that can be delivered in such concentrates. PI polymers may precipitate out of a typical PIC at temperatures below about 20° C., such as below about 0° C., or below about −20° C., or below about −40° C.

In some embodiments, the PICs of the invention are non-aqueous compositions; that is, they are characterized by the substantial absence of water. The PICs of the invention are liquids and stable mixtures at −40° C., such as between about −40° C. to 60° C., or about −40° C. to 0° C., or about −40° C. to −20° C., or about −40° C. to −10° C. By "liquid" it is meant that the PICs of the invention flow and pour, and by "stable liquid" or "stable solution" it is meant that at least 50 wt % (and/or vol %) of the PI polymer in the PIC remains soluble such that the PI polymer would not be removed from the PIC through a filter having a 1000 μm average pore size (in some embodiments a 100 μm average pore size or a 10 μm average pore size). Further, the PICs having the compositions disclosed herein may maintain the PI polymer in stable solution at temperatures below about −40° C. In some embodiments, even when the PICs herein become hazy or translucent at lower temperatures, the PI polymer remains therein in a substantially homogenous stable solution (e.g., substantially no precipitate or solid is observed).

In embodiments, the PICs of the invention comprise up to 30 wt % PI polymer(s), since the solubility (and stability) of the PI(s) in the PIC at temperatures below 20° C. is increased by the addition of the low Log P molecules of the invention. Thus, in embodiments, the PIC of the invention comprises, consists essentially of, or consists of about 1 wt % to 30 wt % PI polymer(s), or about 1 wt % to 25 wt %, or about 2 wt % to 20 wt %, or about 3 wt % to 15 wt %, or about 5 wt % to 10 wt %, or about 10 wt % to 30 wt %, about 5 wt % to 25 wt %, or about 1 wt % to 15 wt %, or greater than about 0 wt % to about 5 wt %, or about 1 wt % to 5 wt %, or about 1 wt % to about 4 wt %, or about 2 wt % to about 3 wt %, or about 5 wt % to 20 wt %, or about 7 wt % to 20 wt %, or about 10 wt % to 20 wt %, or about 1 wt % to 10 wt %, or about 1 wt % to 7 wt %, or about 2 wt % to 6 wt %, or about 3 wt % to 8 wt %, or about 8 wt % to about 12 wt %, or about 8 wt % to about 10 wt %, or about 5 wt % to about 15 wt %, or about 10 wt % to about 15 wt %, or about 12 wt % to about 18 wt % PI. In some embodiments, more than one PI polymer may be present in a PIC, such at two or more PI polymers, or three or more PI polymers. In such embodiments, each of the one or more PI polymers may be present in the PIC in any of the wt % amounts disclosed above (e.g., two PI polymers, both present in 1 wt % to 20 wt % of the PIC composition). In some embodiments, the total amount of the more than one PI polymer(s) may be any of the above disclosed wt % amounts with each of the PI polymers having a substantially even wt % split (e.g., two PI polymers each present as half of 1 wt % to 20 wt % of a PIC composition, or each of three PI polymer present as one third of 1 wt % to 20 wt % of the PI polymers in a PIC composition).

The PIC of the invention comprise at least one low Log P molecule. The low Log P molecule depresses the solidification point or pour point of the PIC composition. The PIC compositions disclosed herein may be stable, pourable compositions even at temperatures of −40° C. or lower.

In some embodiments, suitable low Log P molecules are characterized as having a Log P (that is, a partition coefficient when octanol and water are used) of less than 1 such as about −2 to 0. Log P is the logarithm of the ratio of the concentrations of an un-ionized solute in two immiscible solvents; when one of the solvents is water and the other is a non-polar solvent (e.g., octanol), then the Log P value is also known as a measure of lipophilicity. When the non-polar solvent is octanol (that is, Log P=log([unionized solute in octanol]/[unionized solute in water]), Log P is the partition coefficient or partition constant.

Low Log P molecules having melting points of less than about 20° C. and boiling points greater than 60° C. are especially useful as additives to PICs to reduce or eliminate the solidification of the PI temperatures between about 0° C. to −40° C. (−40 OF), for example about −10° C. to −40° C., or about −20° C. to −40° C., or −30° C. to −40° C., or even below −40° C. while providing compositional stability to temperatures up to 60° C.

Suitable low Log P molecules may include small organic molecules (e.g., 8 or fewer total carbon atoms) having a Log P less than about 1 such as between about −2 and about 0. Such low Log P molecules may have a Log P similar to methanol, but may not be as volatile as methanol at higher temperatures. For example, the low Log P molecules herein may display boiling points exceeding 60° C., 100° C., or 200° C. Since the low Log P molecules have boiling points of greater than 60° C., and in many embodiments greater than 100° C., the low Log P molecules provide minimal contribution to hazardous conditions caused by buildup of pressure within a storage container or other sealed vessel when exposed to temperatures of 60° C. or higher. For example, the PICs disclosed herein can be safely manufactured, transported, stored, and used (e.g., poured) at temperatures encountered in oil fields from the middle east to the arctic (e.g., ranging from 60° C. to about −60° C.) and through seasonal temperature variations. Suitable low Log P molecules may include any of those listed below in Table 1.

Suitable low Log P molecules comprise a non-polymeric molecule having 1 to 8 carbon atoms such as 6, 5, 4 or fewer carbon atoms, and a Log P between about −2 and about 1, such as between about −2 and about 0, or about −1.5 and about 0, or −1 and about 0, or about −0.5 and about 0, or about −0.75 and about −0.1, or about −0.6 and about −0.15, or about −0.5 and −0.2, or about −0.3. In embodiments, the low Log P molecules have a molecular weight of 200 g/mol or less, such as about 150 g/mol or less, or 120 g/mol or less, or about 20 g/mol to about 200 g/mol, or about 30 g/mol to about 150 g/mol. Suitable low Log P molecules include low molecular weight alcohols and molecules having no hydroxyl moieties, as well as mixtures of the foregoing. In some embodiments, the low Log P molecules are characterized by the absence of hydroxyl moieties.

TABLE 1

Low LogP molecules and their corresponding LogP value in octanol/water.

| Compound | LogP |
|---|---|
| Methanol | −0.32 |
| Isopropanol | 0.42 |
| ethylene glycol (HO-CH2-CH2-OH) | −0.95 |
| urea (H2N-C(=O)-NH2) | −1.00 |
| γ-butyrolactone | −0.57 |
| 2-ethylhexanol | 2.87 |
| 2-ethoxyethanol | −0.05 |
| 1,3-dioxolane | 0.13 |
| propylene carbonate | 0.37 |
| N,N-dimethylethanolamine | −0.29 |
| 2-piperidinone | 0.33 |
| morpholine | 0.41 |

TABLE 1-continued

Low LogP molecules and their corresponding LogP value in octanol/water.

| Compound | LogP |
|---|---|
| [3-oxomorpholine structure] | −0.49 |
| [tetramethylurea structure] | −0.54 |
| Butanol | 1.12 |
| Isobutanol | 0.80 |
| [propylene glycol structure] | −0.59 |
| [1,4-dioxane structure] | −0.23 |
| [2-pyrrolidone structure] | −0.18 |
| [butoxyethanol structure] | 1.01 |
| [2-methoxyethanol structure] | −0.43 |
| [1,3-dioxolane structure] | 0.49 |
| [ethylene carbonate structure] | 0.01 |
| [N-methyl-2-pyrrolidone structure] | 0.07 |
| [N-methyl-2-piperidone structure] | 0.57 |
| [N-ethylformamide structure] | −0.14 |
| [dimethylformamide structure] | −0.27 |
| [1,3-dimethylurea structure] | −0.25 |
| [propylene glycol methyl ether acetate structure] | 0.73 |

The PIC or an additive composition to be added thereto include one or more such Log P molecules. Exemplary low Log P molecules (e.g., molecules) suitable for use as a (non-polymeric) PIC freezing point depressant include methanol, isopropanol, 1, 2-propanediol, 1, 4-dioxane, butyrolactone, 2-pyrrolidone, 2-methoxyethanol, dimethylethanolamine, 3-ketomorpholine, a formamide (such as N-ethylformamide), and mixtures including one or more of any of the foregoing. In some embodiments, the low Log P molecule(s) includes amine moieties (e.g., tertiary amines having one or more alcohol moieties) or ether moieties. Such non-hydroxyl moieties may be present on the low Log P molecule in addition to one or more hydroxyl moieties in the low Log P molecule. Examples of suitable low Log P molecule(s) that exclude hydroxyl moieties include butyrolactone, 2-pyrrolidone, 1, 4-dioxane, 2-methoxyethanol, dimethylethanolamine, 3-ketomorpholine, analogues of any of the foregoing, or mixtures of any of the foregoing. In some embodiments, the low Log P molecules is substantially free of hydroxyl moieties. Such hydroxyl free low Log P molecules include butyrolactone, 1, 4-dioxane, 2-pyrrolidone, 3-ketomorpholine, analogues of any of the foregoing, or mixtures of any of the foregoing.

The low Log P molecule(s) or compound(s) is present in the PIC in an amount of about 1 wt % to about 90 wt % of the PIC, or about 5 wt % to about 75%, or about 10 wt % to about 50 wt %, or about 1 wt % to 90 wt %, or about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %. Particular PICs comprise about 1 wt % to about 20 wt % low Log P molecule(s), such as about 1 wt % to 10 wt %, or about 2 wt % to about 10 wt %, or about 3 wt % to about 8 wt %, or about 4 wt % to about 6 wt %, or about 4 wt % to about 10 wt %, or about 3 wt % to about 5 wt %, or about 6 wt % to about 8 wt %, or about 1 wt % to about 5 wt %, or about 1 wt % to about 3 wt %, or about 1 wt % to about 2 wt %, or about 2 wt % to about 4 wt %, or about 5 wt % to about 15 wt %, or about 10 wt % to about 20 wt %, or about 10 wt % to about 15 wt %, or about 5 wt % to about 15 wt %, or about 8 wt % to about 12 wt %, or about 10 wt % to about 20 wt %, or about 15 wt % to about 20 wt %, or about 13 wt % to about 17 wt %, or about 20 wt % or less, or about 15 wt % or less, or about 10 wt % or less, or about 8 wt % or less, or about 5 wt % or less.

In some embodiments, an additive composition (e.g., composition that is added to a PI or PI-solvent mixture) comprises, consists essentially of, or consists of one or more low Log P molecules; one or more refined petroleum solvents or distillates (e.g., HAN); one or more surfactants; one or more biocides, one or more preservatives; one or more stabilizers; or a mixture of two or more of any of the foregoing. Specific mixtures (e.g., combinations and/or amounts of specific low Log P molecules) of the low Log P molecules depress the solidification point of PICs to at least −40° C., while similar mixtures or compounds do not have the desired effect. The mixtures herein may depress the solidification point of PICs stored at −40° C. effective to maintain each component therein (e.g., the PI polymer) in stable solution for weeks or even months at −40° C.

Solubility of the low Log P molecules in aqueous or oil-based systems can be predicted several ways, including HLB (hydrophilic-lipophilic balance) and OHLB (organic hydrophilic-lipophilic balance) values. HLB is most useful for predicting a solvent's solubility in water, and OHLB is most useful for predicting oil/water partitioning of solvents. The two scales run counter each other with respect to hydrophilicity. In some embodiments, the low Log P molecules suitable for use herein have HLB of about 5 to 10, such as about 6 to 9, or about 6 to 10, or about 7 to 10, or about 7 to 9. In some embodiments, the low Log P molecules suitable for use herein have an OHLB of about 10 to 21, such as about 11 to 21, or about 10 to 20, or about 10 to 19, or about 10 to 18, or about 10 to 17, or about 10 to 16, or about 11 to 16.

The HLB scale was derived initially for surfactants and provides a means of comparing the relative hydrophilicity of amphiphilic molecules. HLB values are also relevant for solvents with pseudo-surfactant qualities, such as glycol ethers. Complete water solubility occurs at HLB of about 7.3. Solvents with HLB values above this mark are completely miscible with water, while those below this value are only partially soluble in water. In some embodiments, the low Log P molecules of the invention are soluble in water to at least 0.1 wt % at 20° C. and up to completely miscible in water at 20° C. (that is, any ratio of a low Log P molecule or additive composition including the same and water form a solution). In some embodiments the low Log P molecules or additive composition including the same are soluble in water at between about 1 wt % and 30 wt % at 20° C., for example about 5 wt % to 25 wt %, or about 5 wt % to 20 wt %, or about 10 wt % to 30 wt %, or about 15 wt % to 30 wt %, or about 20 wt % to 30 wt % soluble in water at 20° C.

The low Log P molecules useful in the PIC of the invention are characterized as liquids at 20° C., and as having boiling points in excess of 60° C. at atmospheric pressure. The melting points of the low Log P molecules are generally 20° C. or less at atmospheric pressure, for example about 20° C. to −100° C., or about 15° C. to −80° C., or about −40° C. to about −100° C., or about −30° C. to −90° C. at atmospheric pressure. The boiling points of the low Log P molecules are greater than 60° C. at atmospheric pressure, for example about 60° C. to 300° C. at atmospheric pressure, or about 75° C. to 250° C., or about 100° C. to 250° C., or about 120° C. to 300° C., or about 150° C. to 300° C., or about 120° C. to 250° C. at atmospheric pressure.

In some embodiments, the PIC comprises a refined petroleum distillate or solvent (e.g., naphtha, toluene, xylene, or HAN). The refined petroleum distillate or solvent may be present in the PIC in an amount of about 0.1 wt % to about 90 wt % of the PIC, such as about 1 wt % to about 90 wt %, or about 10 wt % to about 90 wt %, or about 25 wt % to about 85 wt %, or about 30 wt % to about 80 wt %, or about 40 wt % to about 70 wt %, or about 60 wt % to about 90 wt %, or about 70 wt % to about 90 wt %, or about 65 wt % to about 85 wt %, or about 60 wt % to about 80 wt %, or about 50 wt % to about 80 wt %, or about 50 wt % to about 75 wt %, or about 50 wt % to about 67 wt %, or about 40 wt % to about 60 wt %, or about 30 wt % to about 50 wt %, or about 20 wt % to about 40 wt %, or about 20 wt % to about 30 wt %, or about 25 wt % to about 28 wt %, or about 15 wt % to about 35 wt %, or about 10 wt % to about 30 wt %, or about 10 wt % to about 55 wt %, or about 5 wt % to about 20 wt %, or more than about 50 wt %, or more than about 60 wt % of the PIC. In such embodiments, the balance of the PIC includes the PI polymer, low Log P molecule(s), and optionally one or more other additive(s) (e.g., surfactants, biocides, stabilizers, preservatives, etc., as disclosed herein) in any of the respective amounts disclosed herein.

In some embodiments, a PIC comprises one or more surfactants. In an embodiment, the one or more surfactants are nonionic and/or amphoteric surfactants and/or anionic surfactants. The PIC in such embodiments comprises about 0 wt % to 10 wt % of each species of a nonionic, amphoteric, or anionic surfactant, or about 0.5 wt % to 10 wt %, or about 1 wt % to 10 wt %, or about 2 wt % to 10 wt %, or about 3 wt % to 10 wt %, or about 4 wt % to 10 wt %, or about 5 wt % to 10 wt %, or about 4 wt % to about 7 wt %, or about 5 wt % to about 6 wt %, or about 2.5 wt % to about 4 wt %, or about 3 wt % to about 3.5, wt %, or about 0.5 wt % to 9 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 0.5 wt % to 2 wt %, or about 0.5 wt % to 1 wt %, or about 1 wt % to 8 wt %, or about 1 wt % to 5 wt %, or about 1 wt % to about 2 wt %, or about 1.5 wt % nonionic, amphoteric, or anionic surfactant. The PIC in such embodiments comprises about 0 wt % to about 40 wt % total nonionic, amphoteric, and/or anionic surfactant(s), or about 0.5 wt % to 30 wt %, or about 1 wt % to 25 wt %, or about 5 wt % to 30 wt %, or about 5 wt % to 25 wt %, or about 10 wt % to 25 wt %, or about 10 wt % to 20 wt %, or about 15 wt % to about 30 wt %, or about 18 wt % to about 22 wt %, or about 20 wt % nonionic, amphoteric, and/or anionic surfactant(s).

Nonionic surfactants useful in the PIC include but are not limited to alkoxylated alcohols, such as copolymers of ethylene oxide and/or propylene oxide and/or butylene oxide and epoxylated, propoxylated, and epoxylated-propoxylated compounds comprising derivatives of $C_6$-$C_{40}$ alkanols or derivatives of $C_8$-$C_{30}$ alkanols. Suitable alkanols include linear, branched, aromatic, or alkaromatic alkanols. In some embodiments, the alkoxylated alcohols comprise about 3 to 100 alkoxylate repeat units, or about 3 to 90, or about 3 to 80, or about 3 to 70, or about 3 to 60, or about 3 to 50, or about 3 to 40, or about 3 to 30 alkoxylate repeat units. In some embodiments the alkoxylate repeat units are selected from ethoxylate, propoxylate, or a combination thereof in random or block configuration. In many embodiments, a blend of two or more alkoxylated alcohol surfactants are employed in the PIC. In some embodiments, suitable nonionic surfactants may include the $C_8$-$C_{24}$ or $C_{14}$-$C_{24}$ reaction product of a fatty acid conjugated with an ethanolamine, such as cocodiethanolamide. Other nonionic surfactants are similarly useful in the PIC of the invention and are not particularly limited. Some examples of suitable nonionic surfactants include alkylphenol alkoxylates (e.g., nonylphenol ethoxylate), block copolymers of ethylene, propylene and butylene oxides, alkyl polyglucosides, polyalkoxylated glycerides, sorbitan esters and polyalkoxylated sorbitan esters, and alkoyl polyethylene glycol esters and diesters.

Some examples of suitable amphoteric surfactants include alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, betaines, sultaines, alkyl amphoacetates and amphodiacetates, alkyl amphopropionates and amphodipropionates, dodecylbenzene sulfonic acid, and alkyliminodipropionate. Blends of nonionic and/or amphoteric surfactants, including blends of any of the above recited surfactants, may also be usefully employed in the PIC(s) disclosed herein.

Some examples of suitable anionic surfactants include alkylbenzene sulfonates, alkyldiphenoxyether sulfonates and disulfonates, napthalene sulfonates, linear and branched alkyl sulfonates, fatty alcohol sulfates, fatty alcohol ether sulfates, linear and branched alpha olefin sulfonates. Blends of nonionic and/or amphoteric surfactants with anionic surfactants, including blends of any of the above recited surfactants, are also usefully employed in the PIC of the invention.

In some embodiments, the PIC may further comprise at least a residual amount of a weak base, a reaction product thereof, or an analogue thereof. Such a weak base can include one or more amine moieties such as an alkyl amine, or even a non-amine containing weak base configured to quench a residual acid catalyst in the PI polymer. Suitable alkyl amines include monoamines (e.g., methyl amine), diamines (e.g., ethylenediamine), triamines (e.g., diethylenetriamine ("DETA")), etc. Such weak bases having one or more amine moieties may be used to quench or stabilize the PI polymers in PICs prior to or contemporaneously with the addition of one or more low Log P molecules to the PI polymer. Without being bound to a particular theory is currently believed that in some PI polymers, one or more unreacted aldehyde moieties therein (e.g., unreacted formaldehyde in alkyl phenol formaldehyde resins) may act as cross-linkers which cause unwanted solidification in PICs having the same, especially at low temperatures (e.g., at or below 0° C.). Additionally, it is believed that one or more acidic reactants such as p-toluene sulfonic acid ("PTSA") may be present in PI polymers in trace amounts, and quenching with a weak base and/or one or more amine moieties can serve to react (e.g., quench) the organic acid from the PI polymer. Such organic acids are unwanted in PIC compositions because they can potentially precipitate as a seed crystal at low temperatures. A weak base having one or more amine moieties may quench (e.g., react with to terminate further reactions from) the aldehydes present in a PI or PIC containing the same to reduce or eliminate the cross linking effect of the aldehydes in the PI or PIC containing the same during cold storage. Accordingly, the non-crosslinked PI will flow at lower temperatures than a cross-linked PI or PIC containing the same.

In some embodiments, the one or more weak bases having one or more amine moieties may be present in the PI, additive composition, or in the PIC in a concentration of less than about 5000 ppm of the PIC, such greater than 0 ppm to about 5,000 ppm, about 5 ppm to about 2,000 ppm, about 50 ppm to about 2,000 ppm, about 100 ppm to about 1,000 ppm, about 300 ppm to about 700 ppm, about 50 ppm to about 500 ppm, about 400 ppm to about 600 ppm, about 500 ppm to about 1,000 ppm, about 500 ppm to about 1,500 ppm, about 700 ppm to about 1,500 ppm, about 800 ppm to about 1,200 ppm, about 1,000 ppm to about 2,000 ppm, about 1,500 ppm to about 2,500 ppm, about 1,000 ppm, about 500 ppm, about 750 ppm, about 250 ppm, about 100 ppm, or greater than about 100 ppm, or less than about 2,000 ppm, less than about 1,000, less than about 500 ppm, or less than about 250 ppm of the PIC. After mixing the one or more weak bases having one or more amine moieties in the PI and/or PIC, and reaction with any aldehydes therein, the one or more weak bases having one or more amine moieties may be present in only a trace or residual amount.

In some embodiments, a PIC can include 1 wt % to 30 wt % PI polymer(s), about 1 wt % to about 90 wt % low Log P molecules, and about 1 wt % to about 99 wt % refined petroleum solvent. Each component of a PIC may be present in any of the values or ranges disclosed herein. The PIC can include one or more additives such as surfactants, stabilizers (e.g., DETA), biocides, preservatives, etc. Each of at least some of the one or more additives can be present in the PIC in any of the amounts disclosed herein.

In some embodiments, a PIC composition specifically excludes one or more species of any of the additives (or specific species thereof) disclosed herein, such as any of the specific low Log P molecules (e.g., methanol, or an ether), one or more refined petroleum distillates or solvents (HAN, toluene, etc.), one or more of any of the surfactants disclosed herein, a biocide, a preservative, or a stabilizer. For example, a PIC may exclude low Log P molecules having hydroxyl moieties; such PICs thus may be said to be characterized by the absence of Log P molecules having hydroxyl moieties, or characterized by the absence of low Log P molecules that are alcohols.

In some embodiments, the PICs of the invention are characterized as having Brookfield viscosity of about 5 cP to 1000 cP at −40° C., when measured at a shear rate of 10 s using a Brookfield viscometer equipped with a cup and bob, DIN spindle size 21 (viscometer equipment obtained from the Brookfield Engineering Laboratories of Middleboro, Mass.). For example, in some embodiments, the PIC compositions of the invention are characterized as having Brookfield viscosity at −40° C. and 10 s$^{-1}$ of about 5 cP to 900 cP, or about 5 cP to 800 cP, or about 5 cP to 700 cP, or about 5 cP to 600 cP, or about 5 cP to 500 cP, or about 5 cP to 400 cP, or about 5 cP to 300 cP, or about 5 cP to 200 cP, or about 5 cP to 100 cP, or about 10 cP to 1000 cP, or about 15 cP to 1000 cP, or about 20 cP to 1000 cP, or about 25 cP to 1000 cP, or about 30 cP to 1000 cP, or about 40 cP to 1000 cP, or about 50 cP to 1000 cP, or about 60 cP to 1000 cP, or about 70 cP to 1000 cP, or about 80 cP to 1000 cP, or about 90 cP to 1000 cP, or about 100 cP to 1000 cP, or about 10 cP to 500 cP, or about 20 cP to 500 cP, or about 10 cP to 250 cP, or about 20 cP to 250 cP, or about 10 cP to 200 cP, or about 20 cP to 200 cP, or about 10 cP to 100 cP, or about 20 cP to 100 cP.

Additive Compositions Having Low Log P Molecules to Depress the Pour Point of a PIC In certain embodiments, an additive composition having one or more additives therein may be formed separately from, and combined with, a PI polymer, or a PI polymer-refined petroleum distillate mixture. The additive composition can be composed to reduce the pour or solidification point of a PI polymer or PIC comprising the same. The additive composition includes at least one or more low Log P molecules and one or more refined petroleum distillates or solvents. The additive compositions can include one or more low Log P molecules; one or more refined petroleum solvents or distillates such as toluene, xylene, ethyl benzene, HAN, or combinations thereof; one or more stabilizers; one or more surfactants; one or more biocides; one or more preservatives; etc.

As noted above, it has been discovered that certain, not all, low Log P molecules can depress PIC pour (and solidification) points. Specifically, certain compounds having low Log P values are able to depress the pour point of PICs while other, similar low Log P molecules do not. Such solidification point depression allows the PICs to flow and remain stable pourable solutions at temperatures of −40° C. and below, sufficient to allow the PICs to be pumped in extremely cold temperatures.

In some embodiments, similar low Log P molecules can similarly depress the pour points of the same PICs (e.g., same PI polymers), but may vary with different PICs.

Therefore, the log P value of the low Log P molecule(s) is useful in determining which low Log P molecules may have pour point depressing effect in some PICs. For example, methanol and 2-methoxyethanol have similar Log P values and depress the pour points by over 40° C. for alkyl phenol formaldehyde resins, but the effect is lower with α-olefin-maleic anhydride copolymer esters or imides. Suitable low log P values can include any of those disclosed above, such as a Log P between about −2 and about 1.

In some embodiments, one or more low Log P molecules are present in the PIC as an additive from an additive composition in an amount effective to reduce the solidification point of the PICs to temperatures of −40° C. and below. Such additive compositions and/or PICs having the same may include one or more low Log P molecules, one or more refined petroleum distillates or solvents, one or more surfactants, one or more or weak bases having one or more amine moieties, or combinations of any of the foregoing. In some embodiments, the component(s) or combinations thereof in the additive composition(s) or PIC(s) may enable (e.g., activate and/or enhance) the low Log P molecule to depress the solidification point of the PIC as disclosed herein.

In some embodiments, one or more (e.g., two) of the low Log P molecules are present in the additive composition in an amount of about 0 wt % to about 60 wt % of the additive composition, such as about 1 wt % to about 60 wt %, or about 10 wt % to about 60 wt %, or about 25 wt % to about 50 wt %, or about 30 wt % to about 60 wt %, or about 40 wt % to about 60 wt %, or about 45 wt % to about 55 wt %, or about 20 wt % to about 40 wt %, or about 5 wt % to about 20 wt %, or about 5 wt % to about 15 wt %, or about 20 wt % to about 30 wt %, or about 15 wt % to about 35 wt %, or about 10 wt % to about 30 wt %, or less than about 60 wt % of the additive composition. In some embodiments, the additive composition is diluted in a PI polymer and a refined petroleum solvent. In such embodiments, the amount of low Log P molecules in the resulting PIC (diluted by the PI polymer and refined petroleum solvent) can be represented by any of the above values diluted by one half, one third, one quarter, one fifth, or one tenth. In some embodiments, the balance of the additive composition may include one or more refined petroleum solvents or distillates (e.g., toluene), weak base having one or more amine moieties, and/or one or more surfactants. In some embodiments, the additive composition may optionally include preservatives, stabilizers, or biocides as disclosed herein.

In some embodiments, the one or more low Log P molecules and/or weak base having one or more amine moieties may be present in the additive composition in a concentration of less than about 5000 ppm of the additive, such as greater than 0 ppm to about 5000 ppm, about 5 ppm to about 2000 ppm, about 50 ppm to about 2000 ppm, about 100 ppm to about 1000 ppm, about 300 ppm to about 700 ppm, about 50 ppm to about 500 ppm, about 400 ppm to about 600 ppm, about 700 ppm to about 1500 ppm, about 800 ppm to about 1200 ppm, about 1000 ppm to about 2000 ppm, about 1500 ppm to about 2500 ppm, about 1000 ppm, about 500 ppm, about 750 ppm, about 250 ppm, about 100 ppm, or greater than about 100 ppm, or less than 2000 ppm of the additive composition.

In some embodiments, a refined petroleum distillate or solvent (e.g., naphtha or HAN) may be present in the additive composition in an amount of about 0 wt % to about 90 wt % of the additive composition, such as about 10 wt % to about 90 wt %, or about 25 wt % to about 85 wt %, or about 30 wt % to about 80 wt %, or about 40 wt % to about 70 wt %, or about 60 wt % to about 90 wt %, or about 70 wt % to about 90 wt %, or about 65 wt % to about 85 wt %, or about 60 wt % to about 80 wt %, or about 50 wt % to about 75 wt %, or about 50 wt % to about 67 wt %, or about 40 wt % to about 60 wt %, or about 30 wt % to about 50 wt %, or about 20 wt % to about 40 wt %, or about 20 wt % to about 30 wt %, or about 25 wt % to about 28 wt %, or about 15 wt % to about 35 wt %, or about 10 wt % to about 30 wt %, or about 10 wt % to about 55 wt %, or about 5 wt % to about 20 wt %, or more than about 50 wt %, or more than about 60 wt % of the additive composition. In such embodiments, the balance of the additive composition may include the low Log P molecule(s), one or more surfactants, biocides, stabilizers, preservatives, or synergizing components as disclosed herein.

Optionally, the additive composition may further comprise one or more surfactants. In an embodiment, the one or more surfactants are nonionic and/or amphoteric surfactants and/or anionic surfactants as disclosed above. The additive composition in such embodiments may comprise about 0 wt % to 20 wt % of one or more of a nonionic, amphoteric, or anionic surfactant, or about 0.5 wt % to 20 wt %, or about 1 wt % to 20 wt %, or about 2 wt % to 20 wt %, or about 3 wt % to 20 wt %, or about 4 wt % to 20 wt %, or about 5 wt % to 20 wt %, or about 1 wt % to about 15 wt %, or about 5 wt % to about 15 wt %, or about 10 wt % to about 15 wt %, or about 10 wt % to about 20 wt %, or about 15 wt % to 20 wt %, or about 8 wt % to 12 wt %, or about 5 wt % to 10 wt %, or about 8 wt % to 10 wt %, or about 3 wt % to 7 wt %, or about 12 wt % to 16 wt %, or about 0.5 wt % to 8 wt %, or about 0.5 wt % to 7 wt %, or about 0.5 wt % to 6 wt %, or about 0.5 wt % to 5 wt %, or about 0.5 wt % to 4 wt %, or about 0.5 wt % to 3 wt %, or about 0.5 wt % to 2 wt %, or about 0.5 wt % to 1 wt %, or about 1 wt % to 8 wt %, or about 1 wt % to 5 wt %, or about 1 wt % to about 2 wt %, or about 1.5 wt %, or less than about 20 wt %, or less than about 15 wt %, or less than about 1 wt %, or less than about 5 wt %, of nonionic, amphoteric, or anionic surfactant(s).

In some embodiments, any of the above wt % values for low Log P molecules, refined petroleum distillates or solvents, and/or surfactants in an additive composition may be diluted in a PI polymer composition. In such embodiments, the wt % values above may be diluted accordingly, such as by one half, by one third, by one quarter, by one eighth, by one tenth, by one twentieth, by one fiftieth, by one one-hundredth or more, or ranges having endpoints of any of the above values may represent the amount of the corresponding component present in a PIC (e.g., when the additive composition (or individual additive therein) is diluted in other components of a PIC such as the PI polymer and/or refined petroleum solvent, etc.).

Notwithstanding that wt % of the amount of low Log P molecule(s) (or other components of the PICs described herein) present may differ drastically when the wt % is calculated from the wt % of the PIC as opposed to the wt % of the additive composition, the embodiments herein contemplate both amounts.

In embodiments, the PIC may comprise about 1 wt % to 50 wt % of each additive of the additive composition including one or more low Log P molecules. For example, the PICs of the invention may comprise greater than 0 wt % to about 50 wt % of each individual additive (e.g., a low Log P molecule, surfactant, HAN, etc.) of the additive composition, or 0 wt % to about 40 wt %, or 0 wt % to about 30 wt %, or 0 wt % to about 25 wt %, or 0 wt % to about 20 wt %, or 0 wt % to about 15 wt %, or 0 wt % to about 10 wt %, or about 1 wt % to about 50 wt %, or about 10 wt % to about 40 wt %, or about 10 wt % to about 20 wt %, or about 1 wt % to about 10 wt %, or about 1 wt % to about 6 wt %, or about 2 wt % to about 10 wt %, or about 2 wt % to about 5 wt % of one or more individual additives of the additive composition.

In some embodiments, the PICs of the invention may comprise about 2 wt % to about 80 wt % of the additive composition, such as about 2 wt % to 75 wt %, or about 5 wt % to 60 wt %, or about 10 wt % to about 20 wt %, or about 15 wt % to about 35 wt %, or about 30 wt % to about 50 wt %, or about 10 wt % to 75 wt %, or about 40 wt % to 60 wt %, or about 50 wt % to 75 wt %, or about 30 wt % to 80 wt %, or about 25 wt % to 50 wt %, or about 25 wt % to 75 wt % of the additive composition. In some embodiments, the balance of the PIC includes one or more PI polymers; a refined petroleum solvent (e.g., a refined petroleum distillate) such as benzene, toluene, xylene, or naphtha (e.g., HAN); a stabilizer (e.g., DETA); and/or one or more surfactants (e.g., nonylphenol ethoxylate, dodecylbenzene sulfonic acid, or cocodiethanolamide)). In some embodiments, the PIC is characterized by the substantial absence of a refined petroleum solvent. In some embodiments, the PIC includes one or more of biocides, preservatives, and the like without limitation.

Kits Including PIC Compositions

A kit comprising one or more nonaqueous liquid compositions (e.g., PIC(s)) is provided. The kit may include one or more nonaqueous liquid compositions; one or more containers configured to store, transport, mix, or dispense the one or more nonaqueous liquid compositions; and optionally, instructions for use of the nonaqueous liquid composition.

The one or more nonaqueous liquid compositions of the kit may include one or more of any of the PIC compositions and/or any components thereof (e.g., additive(s)) disclosed herein. For example, the kit may include a PIC composition comprising, consisting essentially of, or consisting of a solubilized paraffin inhibiting polymer and a non-polymeric low Log P molecule in a nonaqueous liquid (e.g., solution). The one or more nonaqueous liquid compositions of the kit are or may be used to form stable solutions at temperatures ranging from about 60° C. to about −40° C. The PIC composition may include any of the PI polymers, refined petroleum distillates, low Log P molecules, or other additives (e.g., surfactants, stabilizers, biocides, etc.) disclosed herein in any of the relative amounts disclosed herein. The non-polymeric low Log P molecule(s) may include any of the non-polymeric low Log P molecule(s) disclosed herein.

The kit includes one or more containers configured to hold the nonaqueous liquid compositions at temperatures between about 60° C. and −40° C. The one or more containers may be configured to store, transport, mix, or dispense the one or more nonaqueous liquid compositions. The one or more containers may comprise, consist essentially of, or consist of a bottle, a drum, a tank, can, or any other container suitable to hold a fluid composition therein. The one or more containers may be constructed of metal (e.g., steel), a polymer (e.g., polypropylene), or any other material suitable to resist corrosion from the fluid composition stored therein.

The kit may include instructions for use of the nonaqueous liquid composition. The instructions may include directions detailing how to mix, store, transport, dilute, dispense, or clean the nonaqueous liquid composition. For example, the instructions may include directions detailing how much of the liquid composition should be used in a specific crude oil source based upon the paraffin content therein. Such instructions may include a table detailing the relative amount of the nonaqueous liquid composition to be used per unit time, per unit volume of the crude oil source, or per unit volume of paraffin in the crude oil source.

Methods of Making PICs

An additive composition comprising one or more of the additives disclosed herein may be added to a mixture of a PI polymer and a refined petroleum distillate or solvent (e.g., HAN), to form a PIC having a depressed pour or solidification point (at or below about −40° C.). The additive composition may be added to the PI polymer after the PI polymer is mixed with the refined petroleum distillate or solvent, or may be simultaneously added while the PIC is being formed. In some embodiments, any of the PICs disclosed herein may be formed (e.g., admixed together) at a single point in time or the additive composition may be admixed with the PI polymer (or a PI, petroleum distillate, surfactant mixture) in the field. In some embodiments, one or more components of the additive composition may be supplemented or added to the PIC in the field responsive to environmental conditions. In some embodiments, one or more components of the PIC may be mixed together prior to transportation and/or storage of the PIC. In some embodiments, the additive composition is added to the PIC prior to the addition of the PIC to crude oil.

In some embodiments, a weak base having one or more amine moieties or other stabilizing compound may be mixed with the PI polymer prior to or substantially simultaneously with mixing the low Log P molecule(s) therein. In such embodiments, the weak base having one or more amine moieties may act to neutralize any free aldehyde moieties in the PI polymer composition. Such quenching/stabilization may allow the low Log P molecules to depress the solidification point of the PIC below about −40° C. The weak base having one or more amine moieties may be admixed in the PIC prior to addition of the low Log P molecule(s) or substantially simultaneously therewith.

Methods of Using PIC Compositions

The PICs herein are usefully added to a source of crude oil or another unrefined petroleum source at a concentration typically targeting about 50 ppm to 1000 ppm of the PI. Examples of unrefined petroleum sources may include transfer piping, storage tanks, and transport vessels. Unrefined petroleum is crude oil which has not yet been broken down into its component parts at an oil refinery. In this respect, the PICs herein behave as intended and with the same beneficial effect as conventional PIC. However, in some embodiments, since the additive composition(s) may usefully enable a higher PI concentration than is possible for conventional PIC, a lower rate of pumping, pouring, dripping, spraying etc. of the PIC can be employed to achieve the target PI concentration in the petroleum source. That is, a lower dosing of the pipeline or other system to transport or store crude oil would be required.

While each component of an additive composition or PIC may individually be a solid at −40° C., a principal benefit of the additives is their ability to allow the PIC (encompassing a combination of PI polymer, refined petroleum solvent, and additive composition) to be a stable mixture and flow at temperatures as low as −40° C. Such stable mixtures and flow properties facilitate pouring or pumping of the PIC from a storage container or vessel into contact with a crude oil source requiring paraffin inhibition. Thus, in embodiments, a method of the invention includes forming a non-aqueous liquid composition (PIC) comprising, consisting essentially of, or consisting of a PI polymer, a refined petroleum distillate or solvent, and one or more additives in an additive composition; storing the nonaqueous liquid composition in an enclosed container at a first temperature between about −40° C. and 60° C.; removing the non-aqueous liquid composition from the container at a second temperature between about −40° C. and 60° C.; and applying the non-aqueous liquid composition to a crude oil (unrefined petroleum) source. In embodiments, the removing and the applying are accomplished using a mechanical pump. In embodiments, the first temperature, the second temperature, or both are between about −40° C. and 0° C., or about −40° C. to −10° C., or about −40° to −20° C., or about −40° C. to −30° C. It will be understood that storing and removing are carried out over a variable range of temperatures, and in particular storage temperatures often vary during the storage period. The duration of storage may also vary from about 1 day to five years, such as about 2 days to 1 year, or about 1 week to 6 months, or about 2 weeks to 4 months, or about 1 to 2 months. Such storage may take place under various temperature conditions. Storage may take place under sustained temperature conditions for various durations. For example, storing may extend through the winter and/or summer season. Accordingly, storage may take place at −40° C. to 0° C. (e.g., −40° C.) for months (e.g., 1 hour to 6 months or 1 week to 5 months) in some regions, or may take place at temperatures of as high as about 60° C. for months (e.g., 1 hour to 7 months or 1 week to 3 months) in some regions. Thus, the first temperature of the method is suitably measured at any point during storage, wherein the temperature during at least some period of storage is within the stated range. In some embodiments the applying is sufficient to contact the crude petroleum source with about 5 ppm or more of the PI, such as at about 5 ppm to 10000 ppm of the PI, about 500 ppm to about 5000 ppm of the PI, about 50 ppm to 1000 ppm of the PI, at about 100 ppm to about 500 ppm of the PI, less than about 5000 ppm of the PI, or less than about 2000 ppm of the PI.

The method of applying the PIC to the crude oil source is not particularly limited. One of skill will appreciate that crude oil additives such as paraffin inhibitors are conventionally added by using available equipment including e.g., pipes, mixers, pumps, tanks, injection ports, and the like. Aside from the increased concentration of PI polymer in the PIC of the invention, addition of the PIC to a petroleum source is usefully accomplished using conventional equipment and the same equipment with which an operator in the field is acquainted; that is, no special steps or other procedures are required to use the PIC of the invention. In some embodiments, the PIC is applied to one or more subterranean hydrocarbon recovery (oil well) locations, such as downhole or on the backside using capillary string, gas lift, slip stream or other methods, at the wellhead, or at any other point downstream of the reservoir.

WORKING EXAMPLES

A number of working examples were composed and tested for flow indicative of solidification point depression (e.g., pour point temperatures). The compositions tested herein are said to "pour or flow" at the indicated temperature when the PIC of each working example, vertically at rest on a substantially horizontal surface the cylindrical container (radius 1 inch, height 2 inches), flows observably within about 10 seconds when tipped to a substantially horizontal position. This amount of flow is known to be sufficient to indicate that the composition is pourable or pumpable for use in the field, where such concentrates are applied to one or more crude oil transportation or storage systems. The flowing samples are said to have a pour point at temperatures where the flow is observed. The pour point is above the solidification temperature for a given sample. The effect on pour point was observed according to ASTM D-97 test method (including storage for a half hour in a freezer set the associated temperature prior to observation for pour or flow).

Working Examples 1-7

Working examples 1-7 are a combination of hydroxyl containing low Log P molecules (e.g., various alcohols) with an alkyl phenol formaldehyde resin PI polymer (50% active, that is, 50% of the alkyl phenol formaldehyde resin composition is the alkyl phenol formaldehyde resin, with the balance including xylene, toluene, and ethyl benzene), Flo-Zol 2252, available from Lubrizol Corp. of Wickliffe Ohio. The balance of each working example 1-7, includes HAN (although additional experimentation showed similar results with xylene and toluene). About 2 wt % or about 5 wt % hydroxyl containing low Log P molecules were mixed with the PI polymer and HAN in of the each working example 1-7. The effect on pour point was observed according to ASTM D-97 test method (storage for at least one half hour in a freezer set at a specific temperature (e.g., −60° C.)). The specific low Log P molecules, amounts thereof, amounts of PI polymer, with the balance comprising a refined petroleum distillate or solvent such as HAN; and pour point observations according to ASTM D-97 are listed in Table 2 below.

TABLE 2

Relative amounts of hydroxyl containing low LogP molecules and PI polymers (with HAN comprising the balance of the formulations) in working examples 1-7, and corresponding pour point observations.

| Working Example | Alkyl phenol formaldehyde resin (wt %) | Low LogP Molecule Type | Low LogP Molecules (wt %) | Pour Point |
|---|---|---|---|---|
| 1 | 25 | — | 0 | +10° C. |
| 2 | 25 | Methanol | 2 | <−60° C. |
| 3 | 25 | Isopropanol | 2 | <−60° C. |
| 4 | 40 | Methanol | 5 | <−60° C. |
| 5 | 50 | Methanol | 5 | <−60° C. |
| 6 | 25 | 2-ethyl hexanol | 5 | −5° C. |
| 7 | 25 | 2-butoxyethanol | 5 | −2° C. |

As shown, working example 1, having no low Log P molecules in a PIC including about 25 wt % alkyl phenol formaldehyde resin (50% active), exhibited a pour point of about 10° C. Working example 2, having about 2 wt % methanol in a PIC including about 25 wt % alkyl phenol formaldehyde resin (50% active), exhibited a pour point below −60° C. Working example 3, having about 2 wt % isopropanol in a PIC including about 25 wt % alkyl phenol formaldehyde resin (50% active), exhibited a pour point below −60° C. Working example 4, having about 5 wt % methanol in a PIC including about 40 wt % alkyl phenol formaldehyde resin (50% active), exhibited a pour point below −60° C. Working example 5, having about 5 wt % methanol in a PIC including about 50 wt % alkyl phenol formaldehyde resin (50% active), exhibited a pour point below −60° C. Working example 6, having about 5 wt % 2-ethyl hexanol in a PIC including about 25 wt % alkyl phenol formaldehyde resin (50% active), exhibited a pour point below −5° C. Working example 7, having about 5 wt % 2-butoxyethanol in a PIC including about 25 wt % alkyl phenol formaldehyde resin (50% active), exhibited a pour point below −2° C. Pour point depression was also tested over a 60 day span, while the samples were kept in cold storage at −40° C., with the results showing that the working examples listed as having pour point depression below −60° C. also exhibited flow at −40° C. after 60 day cold storage.

Working Examples 8-10

The effect of low Log P molecules was tested on PICs comprising OMAC PI polymers, specifically OMAC amide polymer systems. Working example 8 was a control sample having no low Log P molecule therein, and working examples 9 and 10 contained 2 ethyl hexanol and methanol respectively. The balance of working examples 8-10 included surfactants and HAN. The surfactants included

TABLE 3

| Working Example | Alpha-Olefin/ Maleic Anhydride Copolymer (wt %) | Surfactants (wt %) | Low LogP Molecule Type | Low LogP Molecules (wt %) | Pour Point |
|---|---|---|---|---|---|
| 8 | 12 | 9.3 | — | 0 | +20° C. |
| 9 | 12 | 9.3 | 2-Ethyl Hexanol | 5 | <+10° C. |
| 10 | 12 | 9.3 | Methanol | 5 | <−21° C. |

As shown in Table 3, the pour point of working examples 9 and 10 were depressed from the pour point of 20° C. for working example 8. The pour point of working example 9, having 5 wt % 2-ethyl hexanol therein, was depressed by about 10° C. The pour point of working example 10, having 5 wt % methanol therein, was depressed by about 41° C.

Working Examples 11 and 12

The relative amounts of pour point depression of PICs having alkyl phenol formaldehyde resin (FloZol 2252) were tested by the ASTM D-97 method. A comparison of pour points was made between control samples having no low Log P molecules and samples including low Log P molecules to determine the total amount of pour point depression.

TABLE 4

Compositions and pour points of working examples 11 and 12.

| Components | Working Example 11 | Working Example 12 |
|---|---|---|
| Flozol 2252 (alkyl phenol formaldehyde resin) | 25 wt % | 25 wt % |
| HAN 150 | 75 wt % | 73 wt % |
| Methanol | 0 wt % | 2 wt % |
| Pour Point | 10° C. | −60° C. |

Working example 11 was used as a control sample having no low Log P molecule(s) therein. Working example 11 comprised 25 wt % (50% active) alkyl phenol formaldehyde resin, with the balance being HAN. Working example 12 comprised 25 wt % (50% active) alkyl phenol formaldehyde resin, 2 wt % methanol (low Log P molecule) with the balance being HAN. The pour point of working example 11 was 10° C. and the pour point of working example 12, having the low Log P molecule therein was −60° C. The low Log P molecule (methanol), even in the relatively low amount of 2 wt %, depressed the pour point by 70° C.

Working Examples 13 and 14

The relative amounts of pour point depression of PICs having combination nonyl phenol formaldehyde resin and alpha olefin/maleic anhydride (OMAC) copolymer PIs (specifically OMAC amide polymers), were tested by the ASTM D-97 method. A comparison of pour points was made between control samples having no low Log P molecules and samples including low Log P molecules to determine the total amount of pour point depression.

TABLE 5

Compositions and pour points of working examples 13 and 14.

| Components | Working Example 13 | Working Example 14 |
|---|---|---|
| OMAC - Fatty Ester/Tallow Amide | 15 wt % | 11.36 wt % |
| Nonyl phenol Formaldehyde Resin | 7 wt % | 5.3 wt % |
| Nonylphenol ethoxylate | 4 wt % | 1.5 wt % |
| Cocodiethanolamide | 4 wt % | 1.5 wt % |
| Dodecylbenzene sulfonic acid (hard) | 2 wt % | 0.75 wt % |
| Methanol | 0 | 5 wt % |
| Han 150 | 65.5 wt % | 74.59 wt % |
| Pour point | 21° C. | −10° C. |

Working example 13 included 15 wt % of OMAC (fatty ester/tallow amide) PI, and 7 wt % of nonyl phenol formaldehyde resin PI, 4 wt % of nonyl phenol ethoxylate, 4 wt % of cocodiethanolamide, 2 wt % dodecylbenzene sulfonic acid (hard), no low Log P molecules, with the balance of the PIC (65.5 wt %) being HAN. Working example 14 included 11.36 wt % of OMAC (fatty ester/tallow amide) PI, and 5.3 wt % of nonylphenol formaldehyde resin PI, 1.5 wt % of nonylphenol ethoxylate, 1.5 wt % of cocodiethanolamide, 0.75 wt % dodecylbenzene sulfonic acid (hard), 5 wt % of methanol, with the balance of the PIC (74.59 wt %) being HAN. The pour point of working example 13 was 21° C. and the pour point of working example 14, having the low Log P molecules therein, was −10° C. The pour point depression between working examples 13 and 14 was 31° C.

Without being bound to a particular theory, it is currently believed that inter-chain hydrogen bonding between polymers (e.g., alkyl phenol resins, OMAC esters and/or amides, acrylates, etc.) leads to gelation in PI polymers. Small molecule, low Log P molecules can penetrate polymer aggregations and interfere with inter-chain hydrogen bonding between polymers. The low Log P molecules also decrease the surface tension and viscosity of the PICs resulting in reduced pour points.

Working Examples 15-19

In order to determine the paraffin inhibition properties of PICs containing low Log P molecules, working examples 15-19 were made and tested using a cold finger test with crude oil from the same source. Different dosages of PICs A and B were cold finger tested using a 30° C. that and 5° C. chiller, at 400 rpm for 4 hours. PICs A and B comprised FloZol 2252, HAN and methanol (low Log P component). PIC A comprised 25 wt % FloZol, 73 wt % HAN, and 2 wt % methanol. PIC B comprised 30 wt % FloZol, 68 wt % HAN, and 2 wt % methanol.

TABLE 6

Dosage of working examples 15 and 16 used in the crude oil and corresponding paraffin inhibition values (in % inhibition) compared to the blank.

| Working Example # | Dosage (ppm) | Weight of Paraffin Deposited (g) | % Inhibition Compared To Working Example 15 |
|---|---|---|---|
| 15 | 0 | 1.6221 | — |
| 16 | 250 ppm of PIC A | 1.2374 | 25 |
| 17 | 500 ppm of PIC A | 0.7057 | 57 |
| 18 | 250 ppm of PIC B | 1.0025 | 39 |
| 19 | 500 ppm of PIC B | 0.8004 | 51 |

As shown in Table 6, the PICs of working examples 16-19 inhibit paraffin deposition in cold finger tests to different extents. Each of working examples 16-19 included the same amount of low Log P molecule—2 wt % methanol—therein. Working example 16, having a lower PI polymer content (25% of PIC A) therein, exhibited a lower percent inhibition (25%) than working example 18 (39%) which as a slightly higher PI polymer content (30 wt % of PIC B) therein. In contrast, working example 19 having a higher PI polymer content (30% of PIC B) therein exhibited a lower percent inhibition (51%) than working example 17 (57%) having a slightly lower PI polymer content (25 wt % of PIC A) therein.

Working Examples 20-27

A relatively low flash point and high volatility may limit the application of hydroxyl containing low Log P molecules in PICs. Suitable compounds having a similar low Log P to methanol may were tested to determine suitability as a PIC additive. Each of the compounds in table 1 was tested for pour point and freezing point. Methanol, isopropanol, 1, 2-propanediol, 1, 4-dioxane, butyrolactone, 2-pyrrolidone, 2-methoxyethanol, and dimethylethanolamine showed promise as pour point depressants in PIC compositions.

As shown in Table 7, further testing was carried out with methanol, isopropanol, butyrolactone, n-ethyl formamide, 2-pyrrolidone, 3-ketomorpholine, and 2-ethyl hexanol. Each of working examples 20-27 comprised an alkyl phenol formaldehyde resin (FloZol 2252) and HAN. Working example 20 was a blank sample having no low Log P molecules therein. Each of working examples 21-27 contained either 2 wt % or 5 wt % of a low Log P molecules, with the balance being HAN. Each working example 20-27 was cold finger tested for pour point.

TABLE 7

Low LogP molecules and corresponding pour point observations.

| Working Example | Alkyl phenol formaldehyde resin (wt %) | Low LogP Molecule Type | LogP | Amount of Low LogP Molecules (wt %) | Pour Point |
|---|---|---|---|---|---|
| 20 | 25 | — | | 0 | 10° C. |
| 21 | 25 | Methanol | −0.32 | 2 | <−60° C. |

TABLE 7-continued

Low LogP molecules and corresponding pour point observations.

| Working Example | Alkyl phenol formaldehyde resin (wt %) | Low LogP Molecule Type | LogP | Amount of Low LogP Molecules (wt %) | Pour Point |
|---|---|---|---|---|---|
| 22 | 25 | Isopropanol | 0.42 | 2 | <−60° C. |
| 23 | 25 | Butryolactone | −0.59 | 5 | −45° C. |
| 24 | 25 | n-Ethyl Formamide | −0.14 | 5 | <−60° C. |
| 25 | 25 | 2-Pyrollidone | −0.18 | 5 | <−60° C. |
| 26 | 25 | 3-Keto-morpholine | −0.49 | 5 | <−60° C. |
| 27 | 25 | 2-Ethyl Hexanol | 2.87 | 5 | −5° C. |

As shown, working example 20, having no low Log P molecules therein, exhibited a pour point of about 10° C. Working example 21 containing 2 wt % of methanol (having a Log P of −0.32) exhibited a pour point below −60° C. Working example 22 containing 2 wt % of isopropanol (having a Log P of 0.42) exhibited a pour point below −60° C. Working example 23 containing 5 wt % of butyrolactone (having a Log P of −0.59) exhibited a pour point at −45° C. Working example 24 containing 5 wt % of n-ethyl formamide (having a Log P of −0.14) exhibited a pour point below −60° C. Working example 25 containing 5 wt % of 2-pyrollidone (having a Log P of −0.18) exhibited a pour point below −60° C. Working example 26 containing 5 wt % of 3-ketomorpholine (having a Log P of −0.49) exhibited a pour point below −60° C. In contrast working example 27 containing 5 wt % of 2-ethyl hexanol—having a relatively high Log P of 2.87—exhibited a pour point at about −5° C. The low Log P molecules having no hydroxyl moieties, low Log P values, and relatively small size (less than 6 carbon atoms)-butyrolactone, n-ethyl formamide, 2-pyrollidone, and 3-ketomorpholine-depressed the pour point of the PICs of working examples 23-27 by at least 55° C.

Working Examples 28-35

A low Log P ether molecules was tested for pour point depression in various PICs. The 2-methoxy ethanol was tested in various amounts in PICs and in PICs having various amounts of PI polymer (alkyl phenol formaldehyde resin) therein. The control, working example 28 included 25 wt % alkyl phenol formaldehyde resin (FloZol 2252) and 75 wt % HAN. Each of working examples 29-35 included alkyl phenol formaldehyde resin (FloZol 2252) and 2 wt % or 5 wt % of 2-methoxy ethanol, with the balance being HAN. Each of working examples 28-35 were pour point tested as described above.

TABLE 8

Relative composition of working examples 28-35 (the balance being HAN) and corresponding pour point observations for the same.

| Working Example | Alkyl Phenol Formaldehyde Resin (wt %) | 2-Methoxy Ethanol (wt %) | Pour Point |
|---|---|---|---|
| 28 | 25 | 0 | 10° C. |
| 29 | 20 | 5 | <−79° C. |
| 30 | 25 | 2 | <−79° C. |
| 31 | 25 | 2 | <−79° C. |
| 32 | 20 | 5 | <−79° C. |
| 33 | 30 | 5 | <−79° C. |

TABLE 8-continued

Relative composition of working examples 28-35 (the balance being HAN) and corresponding pour point observations for the same.

| Working Example | Alkyl Phenol Formaldehyde Resin (wt %) | 2-Methoxy Ethanol (wt %) | Pour Point |
|---|---|---|---|
| 34 | 40 | 5 | <−79° C. |
| 35 | 50 | 5 | <−79° C. |

As shown, 2-methoxy ethanol, which has a Log P of −0.43, lowered the pour point of the PIC of working example 28 by about 90° C. Each of working examples 29-35 depressed the pour point to below −79° C., regardless of alkyl phenol formaldehyde content. Even working examples 30 and 31 having only 2 wt % of the 2-methoxy ethanol were able to depress the pour point to below −79° C.

Working examples 33, 34, and 35, which had 30, 40, and 50 wt % alkyl phenol formaldehyde resin therein exhibited pour points below −79° C. Table 8 demonstrates that some low Log P ethers may serve as pour point depressants in PICs.

Working Examples 36-39

A PIC including a low Log P ether molecules was tested for paraffin inhibition in a number of different crude oils. About 5 wt % of 2-methoxy ethanol in a PIC including 40 wt % alkyl phenol formaldehyde resin (FloZol 2252 50% active PI) and 55 wt % HAN. Each of working examples 36-39 were compared against similar formulations not including a low Log P ether molecule for % inhibition. Each of the PICS of working examples 36-39 were observed prior to mixing with a respective crude oil for room temperature appearance (RT) and flow at −45° C. The various dosages of the PIC were mixed with various crude oils to form working examples 36-39. The working examples were put through a series of thermocycles to determine if the samples were stable and liquid across the temperature ranges of 60° C. to about −45° C. In each thermocycle, the working examples were heated to, and maintained at, 60° C. for 15 hours, each sample was then cooled to ambient temperature before storing them at −45° C. for 3 days. Each of working examples 36-39 were put through at least 2 thermocycles as noted in table 9 below.

Working examples 36-39 were cold finger tested for % inhibition of paraffins (as compared to control samples having no PIC therein). The cold finger test conditions included drop in temperature of about 25° C. for each example and agitation of each sample at about 400 rpm for 4 or 5 hours. The paraffin deposition was weighed and compared to a control sample having no PI polymer therein.

TABLE 9

Cold finger test results for various working examples 36-39.

| Working Example # | RT App. | Flow at −45° C. | Thermocycles 15 h 60° C., RT RT, 3 d −45° C. | Crude Oil | Conditions | Performance Dose of PIC (PPM) | Inhibition (%) |
|---|---|---|---|---|---|---|---|
| 36 | Clear | Free flowing liquid | Pass (2-Cycles) | From Source 1 | 30° C. 5° C. 5 h 400 rpm | 250 500 | 45 55 |
| 37 | Clear | Free flowing liquid | Pass (2-Cycles) | From Source 2 | 40° C. 15° C. 4 h 400 rpm | 250 500 | 49 56 |
| 38 | Clear | Free flowing liquid | Pass (3-Cycles) | From Source 2 | 40° C. 15° C. 5 h 400 rpm | 500 1000 | 64 73 |
| 39 | Clear | Free flowing liquid | Pass (3-Cycles) | From Source 3 | 30° C. 5° C. 5 h 400 rpm | 250 500 | 45 55 |

As shown, each of working examples 35-39 exhibited an increase in paraffin inhibition responsive to an increase in PI polymer dosage. Each of working examples 35-39 exhibited a clear free flowing liquid prior to addition to a respective crude oil. Working examples 37 and 38, tested on the same crude oil type, exhibited steadily increasing paraffin inhibition as the dosage of the PIC compositions increased from 250 to 500 to 100 ppm. Table 8 demonstrates that some low Log P ethers may serve as pour point depressants in PICs.

Working Examples 40-43

Similar testing to that detailed in Table 9 was carried out to determine if quenching of the PI in the PIC prior to mixing with a crude oil had an effect on paraffin inhibition. Working examples 40-43 include various PIC compositions mixed in various crude oils at various dosages. Each of the PI polymers in working examples 40-43 were quenched with DETA prior to admixing in the crude oil. The relative amounts of each component of working examples 40-43 are listed in table 10 below.

A PIC including a low Log P ether molecule was tested for paraffin inhibition in a number of different crude oils after the PI polymer was quenched with DETA. The PI polymer included 2-methoxy ethanol ("MEEG") in a PIC including an alkyl phenol formaldehyde resin (FloZol 2252 50% active PI) and HAN. Working examples 40-43 were cold finger tested as noted above for % inhibition of paraffins as compared to control samples having no PIC therein. Each of the PICS of working examples 40-43 were observed prior to mixing with a respective crude oil for room temperature appearance (RT) and flow at −45° C. The various dosages of the PIC were mixed with various crude oils to form working examples 40-43.

TABLE 10

Cold finger test results for various working examples 40-43.

| Working Example # | PIC Formulation | RT App. | Flow at −45° C. | Thermocycles 15 h 60° C., RT RT, 3 d −45° C. | Crude Oil | Performance Condition | Dose (PPM) | Inhibition (%) |
|---|---|---|---|---|---|---|---|---|
| 40 | 30% PI polymer<br>5% MEEG<br>65% HAN<br>750 ppm DETA | Clear | Free flowing liquid | Pass (2-Cycles) | Source 1 | 40 C.<br>15 C.<br>5 h<br>360 rpm | 500<br>500 | 46<br>50 |
| 41 | 20% PI polymer<br>5% MEEG<br>75% HAN<br>500 ppm DETA | Clear | Free flowing liquid | Pass (2-Cycles) | Source 1 | 40 C.<br>15 C.<br>5 h<br>360 rpm | 500<br>500 | 52<br>44 |
| 42 | 30% PI polymer<br>5% MEEG<br>65% HAN<br>750 ppm DETA | Clear | Free flowing liquid | Pass (3-Cycles) | Source 2 | 40 C.<br>15 C.<br>5 h<br>400 rpm | 500<br>500 | 55<br>59 |
| 43 | 20% PI polymer<br>5% MEEG<br>75% HAN<br>500 ppm DETA | Clear | Free flowing liquid | Pass (3-Cycles) | Source 2 | 40 C.<br>15 C.<br>5 h<br>400 rpm | 500<br>500 | 62<br>64 |

As shown in Table 10, paraffin inhibition was over 40% for each of working examples 40-43. Despite having relatively smaller amounts of PI polymer composition therein (e.g., 20-30 wt % as compared to 40 wt %, of which ½ is the active PI polymer), each of working examples 40-43 exhibited a similar amount of paraffin inhibition as working examples 36-39. This level of paraffin inhibition, despite having less PI polymer therein, is attributed at least in part to quenching unreacted formaldehyde moieties in the alkyl phenol formaldehyde resin with DETA prior to admixing with the crude oil.

Working Examples 44-50

It was observed that PICs having PI polymers with the same formulation (e.g., the same alkyl phenol formaldehyde resin) but from various batches and/or locations, and having the same low Log P molecules, have different solidification and/or pour point depressions despite the same components. Each of working examples 44-50 were composed with alkyl phenol formaldehyde resin from a different batch, of batches 1-6. Each of working examples 44-50 include about 40 wt % of an alkyl phenol formaldehyde resin (FloZol 2252, 50% active PI), about 5 wt % of low Log P molecules (2-methoxyethanol), and about 55 wt % HAN. Various amounts of DETA were admixed with the PICs of working examples 44-50 to quench any unreacted formaldehyde moieties (e.g., from the alkylphenol formaldehyde resin and/or free formaldehyde molecules) therein. The effect of the added DETA was observed after storage of each working example in a freezer overnight at −40° C.

TABLE 11

Effects of DETA addition to working examples 44-50.

| Working Example # | PI Batch | App. at Room Temp. | App. at 60° C. | 0 DETA State at −40° C. | 500 ppm DETA | 750 ppm DETA |
|---|---|---|---|---|---|---|
| 44 | 1 | Clr liq | Clr liq | Liquid | Liquid | Liquid |
| 45 | 2 | Clr liq | Clr liq | Liquid | Liquid | Liquid |

TABLE 11-continued

Effects of DETA addition to working examples 44-50.

| Working Example # | PI Batch | App. at Room Temp. | App. at 60° C. | 0 DETA State at −40° C. | 500 ppm DETA | 750 ppm DETA |
|---|---|---|---|---|---|---|
| 46 | 3 | Clr liq | Clr liq | Liquid | Liquid | Liquid |
| 47 | 4A | Clr liq | Clr liq | Solid | Liquid | Liquid |
| 48 | 4B | Clr liq | Clr liq | Solid | Liquid | Liquid |
| 49 | 5 | Clr liq | Clr liq | Solid | Liquid | Liquid |
| 50 | 6 | Clr liq | Clr liq | Liquid | Liquid | Liquid |

Each of working examples 44-50 had a clear liquid appearance at room temperature and 60° C. As shown, when no DETA was present, working examples 47-49 solidified during storage at −40° C. while working examples 44-46 and 50 remained a liquid. Without being bound to a particular theory it is currently believed that such solidification is due to batch to batch variability in the alkyl phenol formaldehyde resins, despite having purportedly the same formulation. For example, the alkyl phenol formaldehyde resin present in each of working examples 44-50 was supposed to have the exact same composition. Doses of 500 ppm and 750 ppm of DETA were added to each of the PICs of working examples 44-50. After overnight storage in a freezer set at −40° C., each of working examples 44-50 having 500 or 750 ppm of DETA therein remained a liquid.

Working Examples 51-65

Further testing was carried out to determine if the low Log P molecules were effective at pour point depression in mixed paraffin inhibitor systems. The mixed paraffin inhibitor systems of working examples 51-65 included and OMAC ester or amide and an alkyl phenol formaldehyde resin paraffin inhibitor in equal weights. Identical testing on OMAC imides rather than OMAC esters showed similar results. The PICs of working examples 51-65 include various amounts of the low Log P molecule 2-methoxy ethanol; an OMAC stabilizer having varying amounts of mixed glycols (e.g., linear C-13 mixed propylene glycols and ethylene glycols); and one or more solvents. The one or more solvents includes toluene (Tol.), heavy aromatic naphtha (HAN), and an aromatic solvent mix comprising toluene and isoparaffins such as isoocatane, isoheptane, etc. Some of working examples 51-65 included as small amount of a large ether a surfactant including one or more of ethoxylated and/or propoxylated fatty (C10-C30) alcohol(s). All components are shown in grams (g), but suitable examples may be readily converted to a weight % based on each example having approximately 10 grams total weight.

TABLE 12

Solidification point test results for various PICs having mixed PI polymers (OMAC compounds and alkyl phenol formaldehyde resin), low LogP molecule(s), and solvents in various amounts.

| Working Example # | OMAC Type and amount (g) | Alkyl Phenol Formald. (g) | 2-methoxy ethanol (g) | OMAC Stabilizer (g) | Ether Surf. (g) | Aromatic solvent mix (g) | Tol. (g) | HAN (g) | State at −45° C. |
|---|---|---|---|---|---|---|---|---|---|
| 51 | Ester -1 | 1 | 0.8 | 0.8 | | | 6.4 | | Liquid |
| 52 | Ester -1 | 1 | 0.6 | 0.4 | | | 7 | | Solid |
| 53 | Ester -1 | 1 | 0.6 | 0.4 | 0.04 | | 7 | | Liquid |
| 54 | Ester -1 | 1 | 0.6 | 0.4 | 0.04 | 7 | | | Liquid w/ppt |
| 55 | Ester -1 | 1 | 0.6 | 0.4 | 0.04 | | | 7 | Liquid |
| 56 | Amide -1 | 1 | 0.8 | 0.8 | | | 6.4 | | Liquid |
| 57 | Amide -1 | 1 | 0.6 | 0.4 | | | 7 | | Gel |
| 58 | Amide -1 | 1 | 0.6 | 0.4 | 0.04 | | | 7 | Gel |
| 59 | Amide -1 | 1 | 0.6 | 0.4 | 0.04 | 7 | | | Liquid w/ppt |
| 60 | Amide -1 | 1 | 0.6 | 0.4 | 0.04 | | | 7 | Liquid w/ppt |
| 61 | Amide -1 | 1 | 0.8 | 0.8 | | | 6.4 | | Liquid |
| 62 | Amide -1 | 1 | 0.6 | 0.4 | | | 7 | | Gel |
| 63 | Amide -1 | 1 | 0.6 | 0.4 | 0.04 | | 7 | | Gel |
| 64 | Amide -1 | 1 | 0.6 | 0.4 | 0.04 | 7 | | | Liquid w/ppt |
| 65 | Amide -1 | 1 | 0.6 | 0.4 | 0.04 | | | 7 | Solid |

As shown, working examples 51-55 include an OMAC ester (α-olefin (C12-C60) maleic acid co-polymer ester (C12-C40)). When the 2-methoxy ethanol and OMAC stabilizer were present in 8 wt % amounts, the PIC of working example 51 remained a liquid at −45° C. When the 2-methoxy ethanol and OMAC stabilizer were respectively present in 6 and 4 wt % amounts in working example 52, the PIC solidified at −45° C. In working examples 53-55, 0.04 grams of an ether surfactant comprising ethoxylated and/or propoxylated fatty (C10-C30) alcohol was added, and the 2-methoxy ethanol and OMAC stabilizer were respectively present in 6 and 4 wt % amounts, and the PIC remained a liquid in the toluene (working example 53) and HAN (working example 55) at −45° C. The PIC of working example 54, having a mixed aromatic solvent, separated into precipitate (PPT) and liquid phases at −45° C.

Working examples 56-60 include an OMAC amide (α-olefin (C12-C60) maleic acid co-polymer amide (C12-C40)). When the 2-methoxy ethanol and OMAC stabilizer were present in 8 wt % amounts, the PIC of working example 56 remained a liquid at −45° C. When the 2-methoxy ethanol and OMAC stabilizer were present in 6 and 4 wt % amounts in the PIC of working example 57, respectively, the PIC gelled at −45° C. In working examples 58-60, 0.04 grams of an ether surfactant comprising ethoxylated and/or propoxylated fatty (C10-C30) alcohol was added, and the 2-methoxy ethanol and OMAC stabilizer were present in 6 and 4 wt % amounts respectively. The PIC of working example 58, having a toluene solvent, gelled −45° C. The PIC of working example 58, having a mixed aromatic solvent, separated into precipitate (PPT) and liquid phases at −45° C. The PIC of working example 60, having a HAN solvent, separated into precipitate (PPT) and liquid phases at −45° C.

Working examples 61-65 include an OMAC amide. When the 2-methoxy ethanol and OMAC stabilizer were present in 8 wt % amounts, the PIC of working example 61 remained a liquid at −45° C. When the 2-methoxy ethanol and OMAC stabilizer were present in 6 and 4 wt % amounts in the PIC of working example 62, respectively, the PIC gelled at −45° C. In working examples 63-65, 0.04 grams of an ether surfactant comprising ethoxylated and/or propoxylated fatty (C10-C30) alcohol was added, and the 2-methoxy ethanol and OMAC stabilizer were present in 6 and 4 wt % amounts respectively. The PIC of working example 63, having a toluene solvent, gelled −45° C. The PIC of working example 64, having a mixed aromatic solvent, separated into precipitate (PPT) and liquid phases at −45° C. The PIC of working example 60, having a HAN solvent, solidified at −45° C.

Working Examples 66-83

It has been discovered that specific combinations of low Log P molecules, PI polymers, refined petroleum solvents, and other components (e.g., surfactants, etc.) can exhibit pour or solidification point depression while other combinations or even amounts of the same compounds do not depress pour/solidification point. Different OMAC compounds were tested with low Log P additives.

Working examples 66-83 are various formulations of PICs having various paraffin inhibitors, solvents, and low Log P molecule(s). Each of working examples 66-83 include 1.5 grams of OMAC ester or amide paraffin inhibitor, toluene, and a low Log P molecule (i.e., isopropanol (IPA) or 2-methoxyethanol). Each of working examples 66-83 had about a 10.5 wt % active PI polymer percent. Various working examples include ethoxylated castor oil, OMAC stabilizer (as described above), ethoxylated nonyl phenols, and/or aromatic sulfonate surfactant. Each of working examples 66-83 were mixed at room temperature.

81 comprised 0.4 grams of ethoxylated castor oil, with working example 80 comprising 0.5 g of aromatic sulfonate surfactant and working example 81 comprising 1.0 grams of aromatic sulfonate surfactant. Working examples 80 and 81 comprised 6.6 and 6.1 grams of toluene respectively. Working examples 82 and 83 each comprised 0.4 grams of OMAC stabilizer with working example 82 comprising 0.5 g of aromatic sulfonate surfactant and working example 83

TABLE 12

Solidification point test results for various PICs having OMAC PI polymers, various low LogP molecule(s), and various solvents in varied amounts.

| Working Example # | IPA (g) | 2-methoxy ethanol (g) | Ethoxylated Castor Oil (g) | OMAC Stabilizer (g) | Ethoxylated nonylphenols (g) | Surfactant (g) | Tol. (g) | State after 2 hours at 60° C. | State after 24 hours at −45° C. |
|---|---|---|---|---|---|---|---|---|---|
| 66 | 1 | | | 0.4 | | | 7.8 | Solid | Solid |
| 67 | 2 | | | 0.2 | | | 6.3 | Solid | — |
| 68 | 1 | | 0.4 | | | | 7.1 | Solid | Solid |
| 69 | 2 | | 0.2 | | | | 6.3 | Solid | Solid |
| 70 | | 1 | | 0.4 | | | 7.1 | Liquid | Solid |
| 71 | | 2 | | 0.2 | | | 6.3 | Solid | Solid |
| 72 | | 1 | 0.4 | | | | 7.1 | Gel | Liquid |
| 73 | | 2 | 0.2 | | | | 6.3 | Liquid and ppt | Liquid |
| 74 | | 1 | | | | 0.5 | 7.0 | Solid | Solid |
| 75 | | 1 | | | | 1 | 6.5 | Solid | Solid |
| 76 | | 1 | | | | 2 | 5.5 | Solid | Liquid |
| 77 | | | | | | 4 | 4.5 | Solid | Liquid |
| 78 | | | | | 8.5 | | | Solid | Solid |
| 79 | | 2 | | | | 2 | 4.5 | Gel | Semi-solid |
| 80 | | 1 | 0.4 | | | 0.5 | 6.6 | Liquid | Liquid |
| 81 | | 1 | 0.4 | | | 1 | 6.1 | Liquid | Liquid |
| 82 | | 1 | | 0.4 | | 0.5 | 6.6 | Liquid | Liquid |
| 83 | | 1 | | 0.4 | | 1 | 6.1 | Liquid | Liquid |

As shown, the PICs of working examples 70, 72, and 80-83 were liquid after 2 hours in storage at 60° C. None of the working examples having IPA were liquid at tested amount or any duration. As shown, working examples 72, 73, 76, and 80-83 were able to maintain or decrease the solidification point of the respective PICs after 24 hours in storage at −45° C., effective to keep or render the PIC a liquid. Each of working examples 72, 73, 76, 77, and 80-83 included at least 1 gram of 2-methoxyethanol as the low Log P component. The PICs of working examples 76 and 77 were able to change back to a liquid from a solid after 24 hours of storage at −45° C. Working example 77, did not include 2-methoxy ethanol, it included 4 grams of an aromatic sulfonate surfactant and 4.5 grams of Toluene, and 1.5 grams of the OMAC. Working examples 76 and 77 have relatively lower amounts of toluene therein than most of the other working examples 66-83.

Working example 70 comprised 1.5 g OMAC, 1 gram of 2-methoxyethanol, 0.4 grams of an OMAC stabilizer having varying amounts of mixed glycols (e.g., linear C-13 mixed propylene glycols and ethylene glycols), and 7.1 grams of toluene. Working example 70 was a liquid after 2 hours in at 60° C., but solidified after 24 hours at −45° C.

Working examples 72 and 73 comprised 1.5 g OMAC 18-2, 1 and 2 grams of 2-methoxyethanol respectively. Working examples 72 and 73 also comprised 0.4 and 0.2 2 grams of ethoxylated castor oil, respectively. Working examples 72 and 73 were able to change back to a liquid from a gel or liquid/ppt mixture respectively, after 24 hours of storage at −45° C.

Working examples 80-83 comprised 1.5 grams OMAC, and 1 gram of 2-methoxyethanol. Working examples 80 and 81 comprised 0.4 grams of ethoxylated castor oil, with working example 80 comprising 0.5 g of aromatic sulfonate surfactant and working example 81 comprising 1.0 grams of aromatic sulfonate surfactant. Working examples 80-83 were liquid at after 2 hours at 60° C. and after 24 hours at −45° C.

Long term storage testing was carried out using working examples 81-83. Each of working examples 81-83 were stored at −45° C. for 12 days. After 12 days, each of working examples 81-83 was liquid.

The low Log P molecules of the present disclosure can maintain or extend the storage time of PIC compositions in a liquid state for days, weeks, months, or even years.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

We claim:
1. A paraffin inhibiting composition comprising:
about 1 wt % to 30 wt % of a paraffin inhibiting polymer, at least one refined petroleum solvent, and one or more low Log P molecules selected from the group consisting of butyrolactone, N-ethylformamide, 2-pyrrolidone, 3-ketomorpholine, 2-methoxyethanol, and com- binations thereof, wherein the composition is a stable nonaqueous composition that flows at 40° C.

2. The paraffin inhibiting composition of claim 1 wherein the composition comprises about 2 wt % to 20 wt % of the paraffin inhibiting polymer.

3. The paraffin inhibiting composition of claim 1 wherein the composition comprises about or about 10 wt % to 90 wt % of the at least one refined petroleum solvent.

4. The paraffin inhibiting composition of claim 1 wherein the composition comprises about 1 wt % to 50 wt % of the one or more low Log P molecules.

5. The paraffin inhibiting composition of claim 1 wherein the composition comprises about 1 wt % to 10 wt % of the one or more low Log P molecules.

6. The paraffin inhibiting composition of claim 1 further comprising diethylenetriamine or a reaction product thereof.

7. The paraffin inhibiting composition of claim 1 wherein the paraffin inhibiting polymer comprises one or more of polymers a, b, c, and d:

a. an alkylphenol-formaldehyde copolymer having the formula (I)

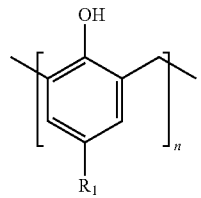

wherein $R_1=C_9-C_{50}$ alkyl and n=2-200;

b. a copolymer comprising the residues of one or more alpha olefin monomers and a maleic anhydride monomer, the one or more alpha olefin monomers having the formula (II)

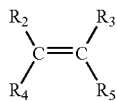

wherein $R_2$, $R_3$, $R_4$, and $R_5$ are independently selected from hydrogen and $C_5-C_{60}$ alkyl, with the proviso that at least two thereof are hydrogen; and the maleic anhydride monomer has the formula (III)

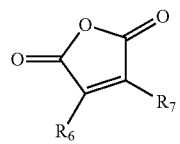

wherein $R_6$ and $R_7$ are independently hydrogen or $C_1-C_{60}$ alkyl, optionally wherein the maleic anhydride residue is further reacted with about 0.01 to 2.0 equivalents of a C12-C60 alkanol or amine per equivalent of anhydride;

c. an alkyl maleimide copolymer having the formula (IV)

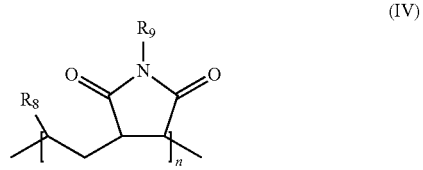

wherein $R_8=C_1-C_{50}$ alkyl, $R_9=C_1-C_{50}$ alkyl, and n=1-200;

d. an acrylate having the formula (V)

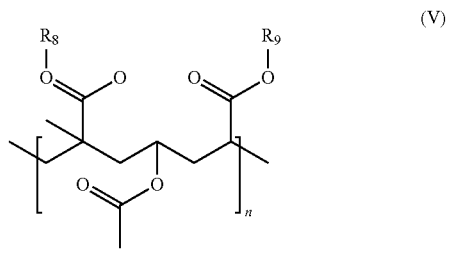

wherein $R_{10}=C_{15}-C_{25}$ alkyl, $R_{11}=C_{10}-C_{15}$ alkyl, and n=1-100.

8. The paraffin inhibiting composition of claim 1 wherein:
the paraffin inhibiting polymer comprises an alkylphenol-formaldehyde copolymer and the paraffin inhibiting polymer is about 1 wt % to about 20 wt % of the composition;
the at least one refined petroleum solvent comprises heavy aromatic naphtha and is about 50 wt % to about 80 wt % of the composition; and
the one or more low Log P molecules are about 1 wt % to about 20 wt % of the composition.

9. The paraffin inhibiting composition of claim 1 wherein:
the paraffin inhibiting polymer comprises a plurality of paraffin inhibiting polymers including an alkylphenol-formaldehyde copolymer and a copolymer comprising the residues of one or more alpha olefin monomers and a maleic anhydride monomer;
each of the paraffin plurality of paraffin inhibiting polymers is about 1 wt % to about 15 wt % of the composition;
the at least one refined petroleum solvent includes one or more of heavy aromatic naphtha and toluene and is about 50 wt % to about 80 wt % of the composition; and
the one or more low Log P molecules is about 1 wt % to about 10 wt % of the composition.

10. A crude oil composition, comprising:
a crude oil source; and
a paraffin inhibiting composition of claim 1;
wherein the paraffin inhibiting polymer is present in the crude oil source at about 5 ppm to 10000 ppm.

11. A method of applying a paraffin inhibitor to a crude oil source, the method comprising:
forming a paraffin inhibitor concentrate of claim 1;
storing the paraffin inhibiting composition in an enclosed container at a first temperature between about −40° C. and 60° C.;
removing the paraffin inhibiting composition from the container at a second temperature between about −40° C. and 60° C.; and
applying the paraffin inhibiting composition to a crude oil source, wherein the removing and the applying are accomplished using a mechanical pump.

12. The method of claim 11 wherein the first temperature, the second temperature, or both the first and second temperature is between about −40° C. and −20° C.

13. The method of claim 11 further comprising quenching the paraffin inhibiting polymer with a weak base having one or more amine moieties with the paraffin inhibiting polymer prior to forming the paraffin inhibitor concentrate.

14. The method of claim 13 wherein the weak base having one or more amine moieties includes diethylenetriamine.

15. The method of claim 11 wherein the forming comprises mixing about 2 wt % to 20 wt % of the paraffin inhibiting polymer, about 10 wt % to 90 wt % of the at least one refined petroleum solvent, and about 1 wt % to 50 wt % of the one or more low Log P molecules.

16. A paraffin inhibiting composition comprising:
about 1 wt % to 30 wt % of a paraffin inhibiting polymer,
at least one refined petroleum solvent,
and one or more low Log P molecules selected from the group consisting of N-ethylformamide, 2-pyrrolidone, 3-ketomorpholine, 2-methoxyethanol, and combinations thereof,
wherein the composition is a stable nonaqueous composition that flows at −40° C.

17. The paraffin inhibiting composition of claim 16, wherein the composition comprises about 1 wt % to 10 wt % of the one or more low Log P molecules.

18. The paraffin inhibiting composition of claim 17, wherein the composition comprises about 60 wt % to about 90 wt % of the at least one refined petroleum solvent.

* * * * *

UNITED STATES PATENT AND TRADEMARK OFFICE
CERTIFICATE OF CORRECTION

PATENT NO. : 10,465,854 B2  
APPLICATION NO. : 15/480959  
DATED : November 5, 2019  
INVENTOR(S) : Kousik Kundu Page 1 of 1

It is certified that error appears in the above-identified patent and that said Letters Patent is hereby corrected as shown below:

In the Claims

Column 37, Claim 3, Line 7: Delete "or about"

Column 38, Claim 7: " 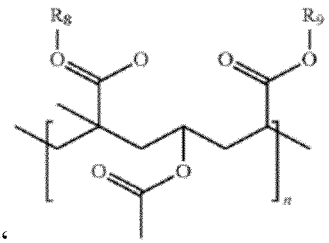 " should be -- 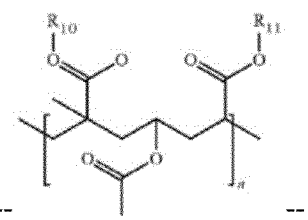 --

Signed and Sealed this  
Seventeenth Day of March, 2020

Andrei Iancu  
*Director of the United States Patent and Trademark Office*